(12) United States Patent
Seo et al.

(10) Patent No.: US 10,001,809 B2
(45) Date of Patent: Jun. 19, 2018

(54) FLEXIBLE DISPLAY DEVICE AND METHOD OF CONTROLLING SAME

(71) Applicant: SAMSUNG ELECTRONICS CO., LTD., Suwon-si (KR)

(72) Inventors: Joon-kyu Seo, Suwon-si (KR); Kyung-a Kang, Seoul (KR); Hyun-jin Kim, Seoul (KR); Nipun Kumar, Suwon-si (KR); Chang-soo Lee, Seosan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 14/423,211

(22) PCT Filed: Aug. 22, 2013

(86) PCT No.: PCT/KR2013/007553
§ 371 (c)(1),
(2) Date: Feb. 23, 2015

(87) PCT Pub. No.: WO2014/030947
PCT Pub. Date: Feb. 27, 2014

(65) Prior Publication Data
US 2015/0220119 A1    Aug. 6, 2015

(30) Foreign Application Priority Data
Aug. 22, 2012 (KR) ........................ 10-2012-0091885

(51) Int. Cl.
*G06F 1/16* (2006.01)
*G09F 9/30* (2006.01)
(Continued)

(52) U.S. Cl.
CPC .............. *G06F 1/1652* (2013.01); *G06F 3/03* (2013.01); *G06F 3/041* (2013.01); *G06F 3/0414* (2013.01);
(Continued)

(58) Field of Classification Search
CPC ......... G06F 1/1652; G06F 2203/04102; G06F 2203/04103; G06F 3/01; G06F 3/03;
(Continued)

(56) References Cited

U.S. PATENT DOCUMENTS 7,705,834 B2    4/2010  Swedin
8,970,455 B2 *  3/2015  Thorson .................. G06F 3/147
                                                        345/105
(Continued)

FOREIGN PATENT DOCUMENTS

CN    102522049 A    6/2012
EP    2192750 A2     6/2010
(Continued)

OTHER PUBLICATIONS

Search Report dated Dec. 2, 2013 issued in International Application No. PCT/KR2013/007553 (PCT/ISA/210).
(Continued)

*Primary Examiner* — Latanya Bibbins
(74) *Attorney, Agent, or Firm* — Sughrue Mion, PLLC

(57) ABSTRACT

A flexible display device including: a flexible display; a first sensor configured to sense an exposed area of the display which is exposed in a rolled state of the display; a second sensor configured to sense a user grip area within the exposed area, the user grip area corresponding to a user grip; and a controller configured to, in response to the exposed area and the user grip area being sensed, control the display to display a screen on the exposed area excluding the user grip area.

19 Claims, 29 Drawing Sheets

(51) Int. Cl.
- *G06F 3/041* (2006.01)
- *G06F 3/147* (2006.01)
- *G06F 3/03* (2006.01)
- *G09G 5/00* (2006.01)
- *G09G 5/37* (2006.01)
- *G09F 27/00* (2006.01)
- *G06F 3/0487* (2013.01)
- *G06F 3/0488* (2013.01)

(52) U.S. Cl.
CPC .......... *G06F 3/0416* (2013.01); *G06F 3/0487* (2013.01); *G06F 3/04886* (2013.01); *G06F 3/147* (2013.01); *G09F 9/301* (2013.01); *G09F 27/005* (2013.01); *G09G 5/003* (2013.01); *G09G 5/37* (2013.01); *G06F 2203/04102* (2013.01); *G06F 2203/04103* (2013.01); *G06F 2203/04803* (2013.01); *G09G 2320/08* (2013.01); *G09G 2330/022* (2013.01); *G09G 2340/0464* (2013.01); *G09G 2354/00* (2013.01); *G09G 2380/02* (2013.01)

(58) Field of Classification Search
CPC ...... G06F 3/041; G06F 3/0414; G06F 3/0416; G06F 3/14; G06F 3/147; G09F 9/00; G09F 9/301; G09G 2320/08; G09G 2330/022; G09G 2340/0464; G09G 2354/00; G09G 2380/02; G09G 5/00; G09G 5/003; G09G 5/37

See application file for complete search history.

(56) References Cited

U.S. PATENT DOCUMENTS

| | | | |
|---|---|---|---|
| 2007/0046639 A1 | 3/2007 | Swedin | |
| 2008/0291225 A1 | 11/2008 | Arneson | |
| 2008/0294333 A1* | 11/2008 | Engel | G01C 21/3415 701/533 |
| 2008/0303782 A1* | 12/2008 | Grant | G06F 1/1615 345/156 |
| 2009/0184935 A1 | 7/2009 | Kim | |
| 2010/0056223 A1 | 3/2010 | Choi et al. | |
| 2010/0253641 A1 | 10/2010 | Swedin | |
| 2011/0148915 A1 | 6/2011 | Kim | |
| 2011/0169868 A1* | 7/2011 | Amemiya | G06F 1/1626 345/676 |
| 2012/0032979 A1* | 2/2012 | Blow | G06F 1/1626 345/173 |
| 2013/0265223 A1* | 10/2013 | Khosravy | G01C 21/20 345/156 |
| 2013/0285922 A1* | 10/2013 | Alberth, Jr. | G06F 1/1694 345/173 |

FOREIGN PATENT DOCUMENTS

| | | |
|---|---|---|
| KR | 10-20070094335 A | 9/2007 |
| KR | 10-2010-0027501 A | 3/2010 |
| KR | 10-2010-0041733 A | 4/2010 |
| KR | 10-2010-0050318 A | 5/2010 |
| KR | 10-2011-0069476 A | 6/2011 |
| RU | 2 363 991 C2 | 8/2009 |

OTHER PUBLICATIONS

Communication dated May 20, 2016, issued by the European Patent Office in counterpart European Application No. 13831749.0.
Communication dated Nov. 11, 2016 issued by the European Patent Office in counterpart European Application No. 13831749.0.
Communication dated Dec. 22, 2016 issued by the State Intellectual Property Office of P.R. China in counterpart Chinese Application No. 201380055329.1.
Communication dated Apr. 21, 2017, issued by the European Patent Office in counterpart European Application No. 13831749.0.
Communication issued by the Russian Patent Office dated Aug. 2, 2017 in counterpart Russian Patent Application No. 2015109938.
Communication issued by the Korean Intellectual Property Office dated Aug. 8, 2017 in counterpart Korean Patent Application No. 10-2012-0091885.

* cited by examiner

FIG. 7
(a)
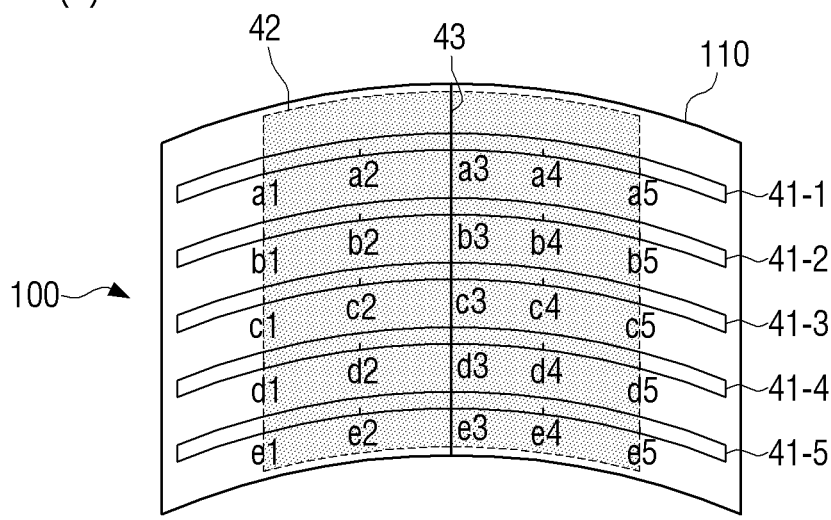
(b)
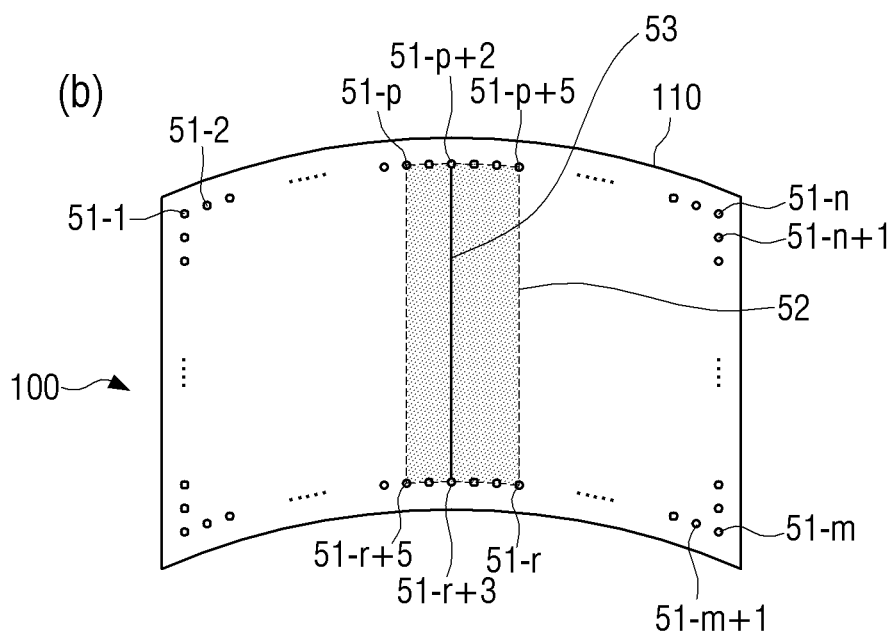

FIG. 10
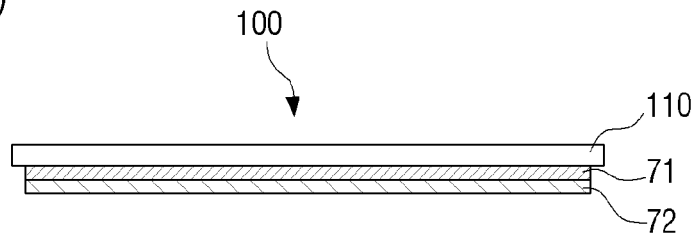
(a)
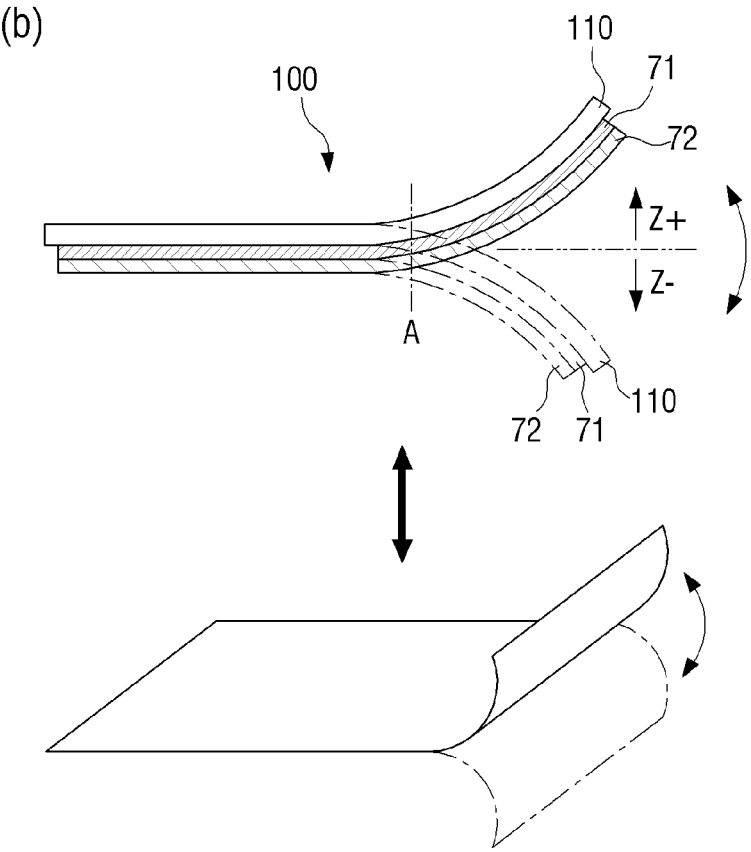
(b)
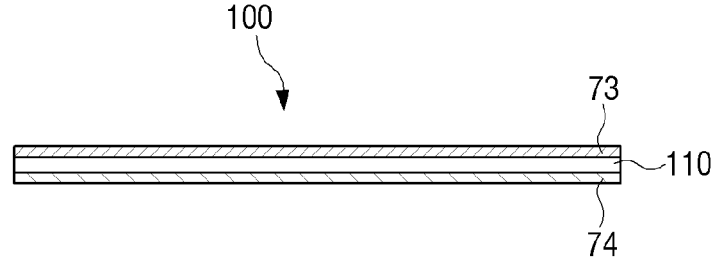
(c)

FIG. 13
(a)
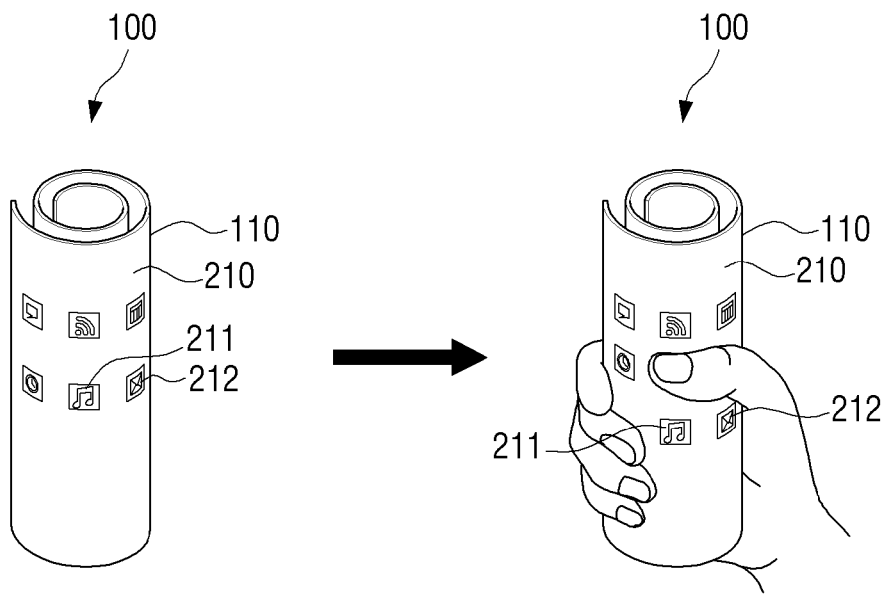
(b)
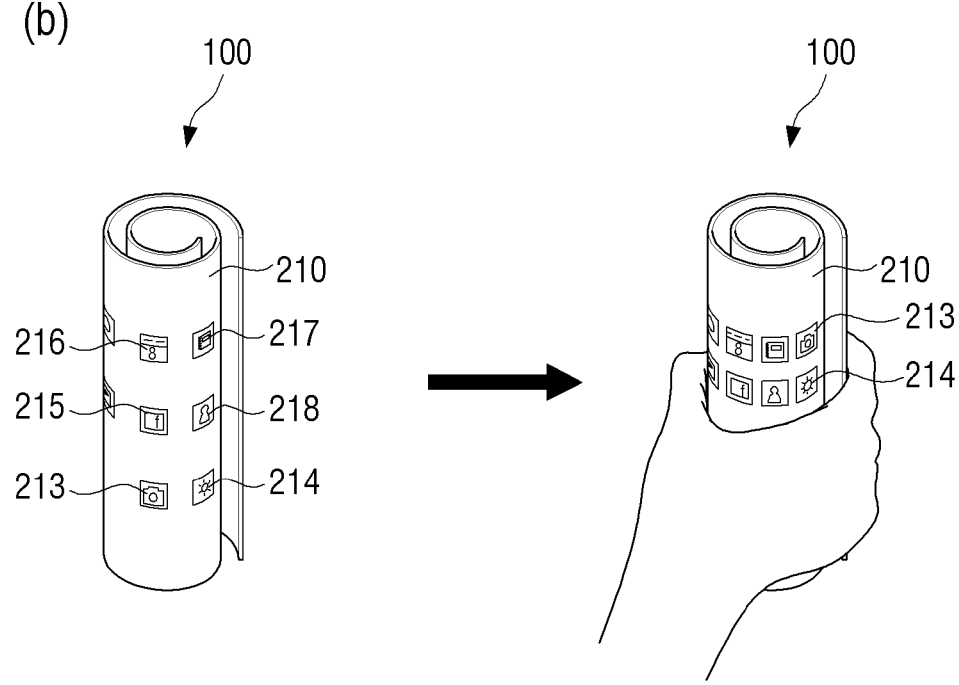

FIG. 16
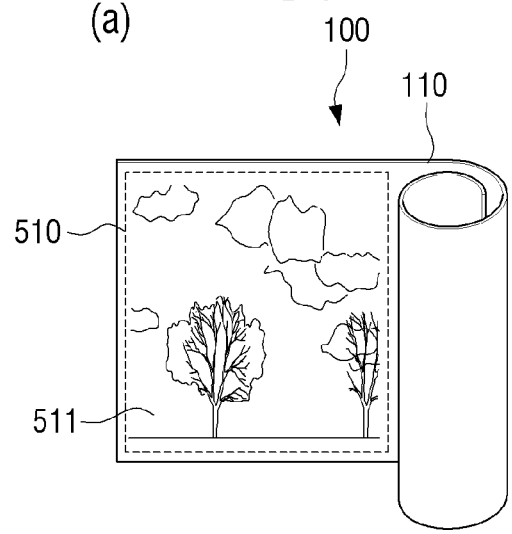
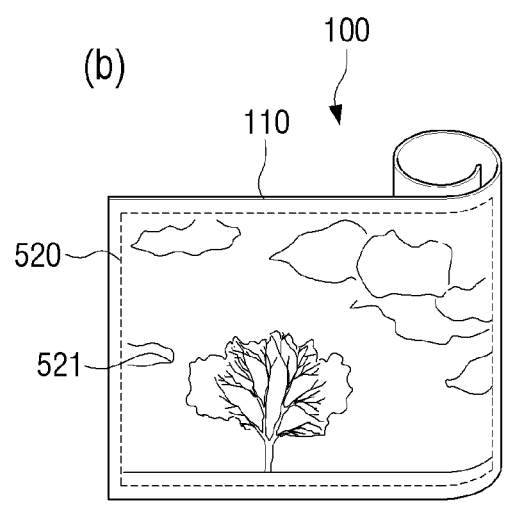
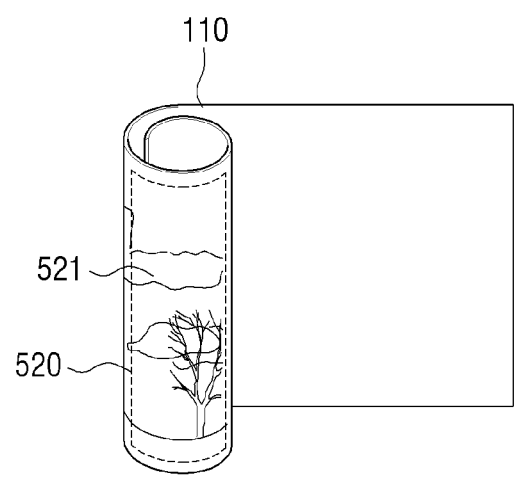

FIG. 17
(a)
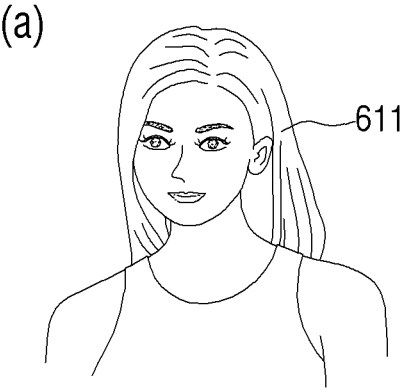
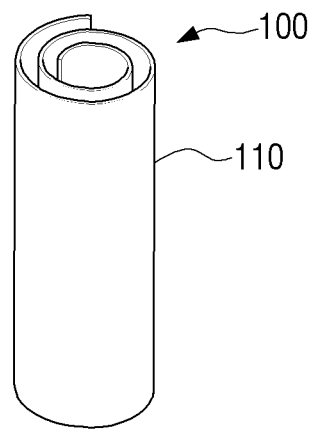
(b)
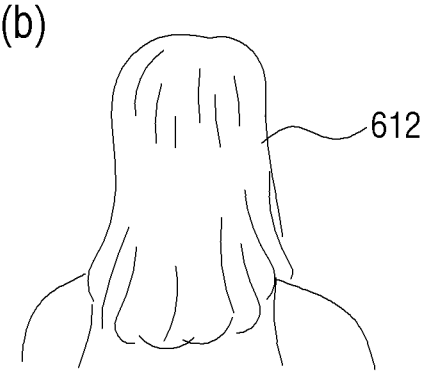

FIG. 20
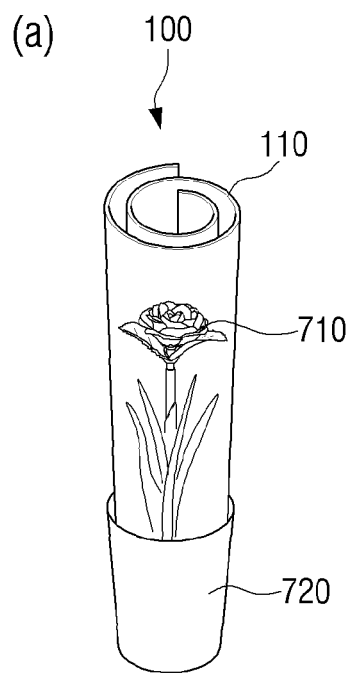
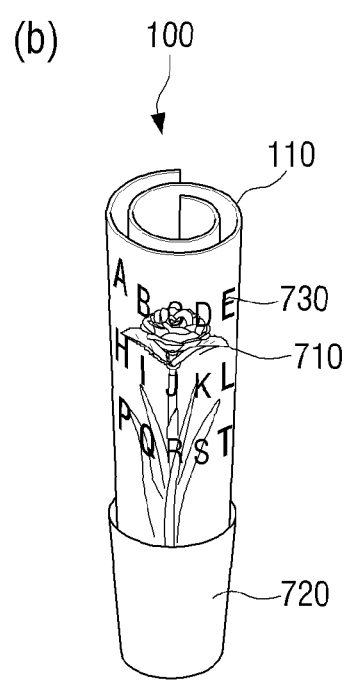

FIG. 25
(a)
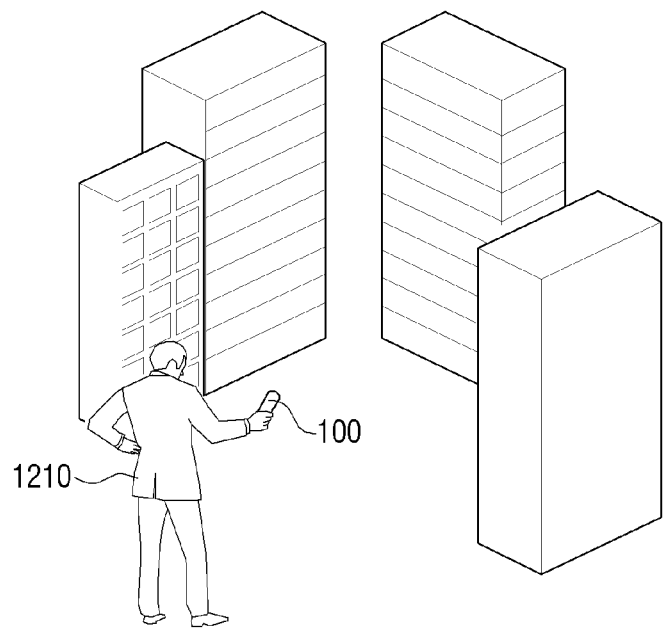
(b)
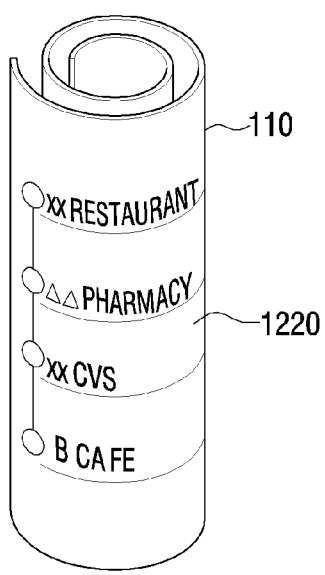
(c)
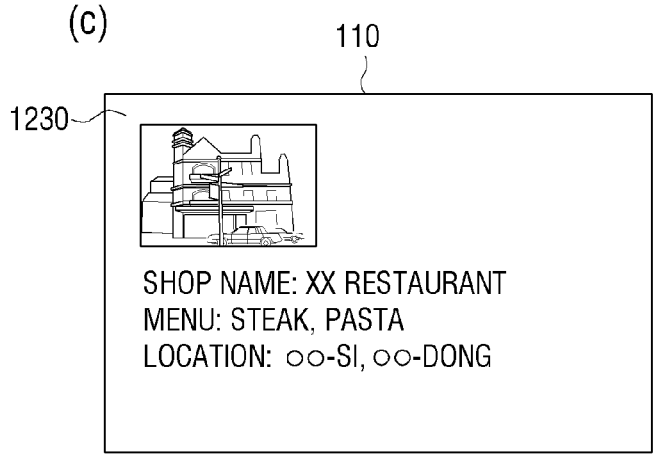

FLEXIBLE DISPLAY DEVICE AND METHOD OF CONTROLLING SAME

CROSS-REFERENCE TO RELATED APPLICATIONS

This application is a national stage application under 35 U.S.C. § 371 of International Application No. PCT/KR2013/007553, filed on Aug. 22, 2013, which claims priority from Korean Patent Application No. 10-2012-0091885, filed on Aug. 22, 2012 in the Korean Intellectual Property Office, the disclosure of which is incorporated herein by reference in its entirety.

BACKGROUND OF THE INVENTION

1. Field of the Invention

Methods and apparatuses consistent with one or more exemplary embodiments generally relate to a flexible display device and a method of controlling the same, and, more particularly, to a display device which includes a transformable display and a method of controlling the same.

2. Description of the Related Art

With the development of electronic technologies, various types of electronic devices have been developed. In particular, display devices, such as a television (TV), a personal computer (PC), a laptop computer, a tablet PC, a mobile phone, an MP3 player, and the like, are used in many households.

In order to satisfy various user needs for various functions, efforts to develop display devices having various shapes have been made. Such display devices may be called next-generation display devices.

Next-generation display device may include a flexible display device, for example. A flexible display device may be a portable device such as a mobile phone, a tablet PC, an electronic picture frame, a Personal Digital Assistant (PDA), an MP3 player, and the like. The flexible display device refers to a display device of which shape may be transformed like paper. Unlike conventional display devices, flexible display devices have flexible displays The flexible display device may be bent and transformed by applying force, and thus, may be used in various purposes.

There is a need to display appropriate screens on a flexible display device of which the shape may be transformed.

SUMMARY OF THE INVENTION

One or more exemplary embodiments have been provided to address the aforementioned and other problems and disadvantages occurring in the related art. An aspect of one or more exemplary embodiments provides a flexible display device which is capable of displaying an appropriate screen on a rolled display surface in response to a display being rolled and a method of controlling the same.

According to an exemplary embodiment, there is provided a flexible display device including: a flexible display; a first sensor configured to sense an exposed area of the display which is exposed in a rolled state of the display; a second sensor configured to sense a user grip area within the exposed area, the user grip area corresponding to a user grip; and a controller configured to, in response to the exposed area and the user grip area being sensed, control the display to display a screen on the exposed area excluding the user grip area.

The controller may be further configured to change a screen displayed on the exposed area so that an object displayed on the user grip area is moved to an area of the exposed area other than the user grip area.

The controller may be further configured to control the display to display an animation effect of moving the object from the user grip area to the other area of the exposed area.

The controller may be further configured to, in response to the rolled state of the display being released, control the display to display the screen displayed on the exposed area on a newly exposed area of the display exposed by the release.

The display may include a double-sided display including a first display surface and a second display surface facing opposite sides. The controller may be further configured to, in response to the display being rolled so that the first display surface includes the exposed area and then the rolled state being released, control the display to display the screen displayed on the exposed area on a newly exposed area of the second display surface exposed by the release.

The controller may be further configured to, when the flexible display device is in the rolled state, control the display to display an object across a boundary portion between an edge area of the display and an area of the exposed area which coincides with the edge area.

The controller may be further configured to, in response to the display being partially rolled in a direction of an inner surface of the display, control the display to display the screen corresponding to a size and a shape of a remaining area of the display excluding an area which is bent by the partial rolling.

The controller may be further configured to, in response to the display being partially rolled in a direction of an outer surface, control the display to display the screen corresponding to a size and a shape of a remaining area of the display excluding an area of a screen of the display which is in contact with the inner surface of the display.

The controller may be further configured to, when the display is in the rolled state, determine a size and a location of the exposed area based on a sensing result of the first sensor.

The controller may be further configured to, when the display is in the rolled state, calculate a cross section radius of the display based on the sensing result of the first sensor, and determine the exposed area based on the calculated cross section radius.

The second sensor may include a touch sensor configured to sense a touched area on the display. The controller may be further configured to, in response to the touched area being larger than a predetermined size and being sensed for a predetermined time while the display device is in the rolled state, determine that the touched area is the user grip area.

The second sensor may include a pressure sensor configured to sense pressure applied to the display. The controller may be further configured to, in response to the pressure being greater than a predetermined level and being sensed for a predetermined time while the display device is in the rolled state, determine that an area where the pressure was sensed is the user grip area.

According to another exemplary embodiment, there is provided a method of controlling a flexible display device with a display, the method including: sensing an exposed area of the display that is exposed while the display is in a rolled state; sensing a user grip area within the exposed area, the user grip area corresponding to a user grip; and displaying, in response to the exposed area and the user grip area being sensed, a screen on the exposed area excluding the user grip area.

The displaying may include changing a screen displayed on the exposed area so that an object displayed on the user grip area is moved to an area of the exposed area other than the user grip area.

The displaying may include displaying an animation effect of the object moving from the user grip area to the area of the exposed area excluding the user grip area.

According to another exemplary embodiment, there is provided a flexible display device including: a flexible display capable of being rolled; a first sensor configured to sense an area of the display which is exposed when the display is in a rolled state; a second sensor configured to sense a covered area with the exposed area; and a controller configured to control the flexible display to display a screen on an area of the exposed area of the flexible display excluding the covered area.

The flexible display may further include a transceiver configured to receive a text message. The controller may be further configured to control the display to display the received text message overlapping the displayed screen.

The flexible display may further include a camera configured to capture an image of a user. The controller may be further configured to determine a portion of the exposed area viewed by the user based on the captured image, and to control the display to display the screen on the viewed portion of the exposed area.

The controller may be further configured to, in response to a starting point and a destination being entered while the display is in a flat state and the display being rolled into the rolled state, control the display to display route information on the exposed area.

The controller may be further configured to, in response to a starting point and a destination being entered while the display is in a flat state and the display being rolled into the rolled state, control the display to display a plurality of recommended routes on the exposed area.

The controller may be further configured to, in response to the display device being pointed towards one or more points of interest while the display is in the rolled state, control the display to display list of the plurality of points of interest on the exposed area.

According to the above-described various exemplary embodiments, the flexible display device may display a screen which is suitable for a rolled display. Accordingly, usability of the flexible display device may increase.

BRIEF DESCRIPTION OF THE DRAWINGS

The above and/or other aspects will be more apparent by describing certain exemplary embodiments with reference to the accompanying drawings, in which:

FIGS. 6 to 8 show views illustrating sensing a shape transformation of a flexible display device according to one or more exemplary embodiments;

FIG. 10 shows views illustrating sensing a bending direction using a bend sensor according to an exemplary embodiment;

FIG. 13 shows views illustrating a screen displayed in response to a user grip area being sensed in a rolled display according to an exemplary embodiment;

FIG. 16 shows views illustrating displaying a screen in response to a display being partially rolled according to an exemplary embodiment;

FIGS. 17 to 19 are views illustrating a method of determining a location of a screen which is displayed in a rolled state according to an exemplary embodiment;

FIG. 20 shows views illustrating a screen displayed on a rolled display according to an exemplary embodiment;

FIG. 25 shows views illustrating performing a route guide function by a flexible display device according to an exemplary embodiment;

DETAILED DESCRIPTION

Figure 1:
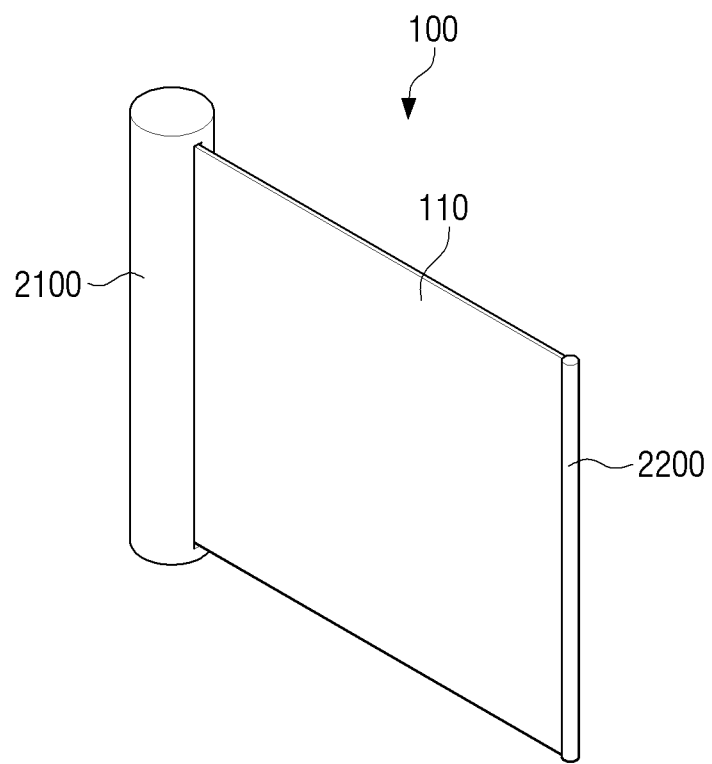
FIG. 1 is a view illustrating a flexible display device according to an exemplary embodiment.

Certain exemplary embodiments are described in greater detail below with reference to the accompanying drawings.

In the following description, like drawing reference numerals are used for the like elements, even in different drawings. The matters defined in the description, such as detailed constructions and elements, are provided to assist in a comprehensive understanding of one or more exemplary embodiments. However, exemplary embodiments can be practiced without those specifically defined matters. Also, well-known functions or constructions are not described in detail since they would obscure the application with unnecessary detail.

FIG. 1 is a view illustrating a flexible display device according to an exemplary embodiment.

According to FIG. 1, a flexible display device 100 may include a main body 2100, a display 110, and a grip portion 2200.

The flexible display device 100 refers to a device which may be bent, warped, folded, or rolled like paper while maintaining characteristics of a conventional flat-panel display device. Accordingly, the flexible display device 100 including the display 110 has a bendable characteristic, and the display 110 is made with a bendable structure and material. The display 110 will be described below with reference to FIG. 5.

The main body 2100 holds the display 110. The main body 2100 includes a rotation roller which rolls the display 110. Accordingly, when the display 110 is not in use, the display 110 may be rolled around the rotation roller and stored in the main body 2100.

In response to the grip portion 2200 being gripped and pulled by a user, the rotation roller is rotated in an opposite direction of a rolling direction. Accordingly, a rolled state is released, and the display 110 comes out of the main body 2100. The rotation roller may include a stopper. In response to the grip portion 2200 being pulled a certain distance by the user, rotation of the rotation roller is stopped by the stopper, and the display 110 may be fixed.

Meanwhile, in response to a button mounted on the main body 2100 being pressed by the user to release the stopper, the stopper is released, and the rotation roller is rotated. As the result, the display 110 may be again rolled into the main body 2100. The stopper may be a switch that stops an operation of a gear for rotating the rotation roller. The rotation roller and the stopper may be realized using a common rolling structure, and, thus, a detailed description thereof will be omitted.

Meanwhile, the main body 2100 includes a power unit. The power unit may be realized in various forms, such as a battery connector to which a disposable battery is mounted, a secondary cell that may be used and recharged multiple times, a solar cell that generates power using solar energy, and the like. In case of a secondary cell, a user is able to connect the main body 2100 to an external power source to charge the power unit.

FIG. 1 illustrates the main body 2100 having a cylindrical structure, but the main body 2100 may be realized as a different shape such as a square shape or a polygonal shape.

Figure 2:
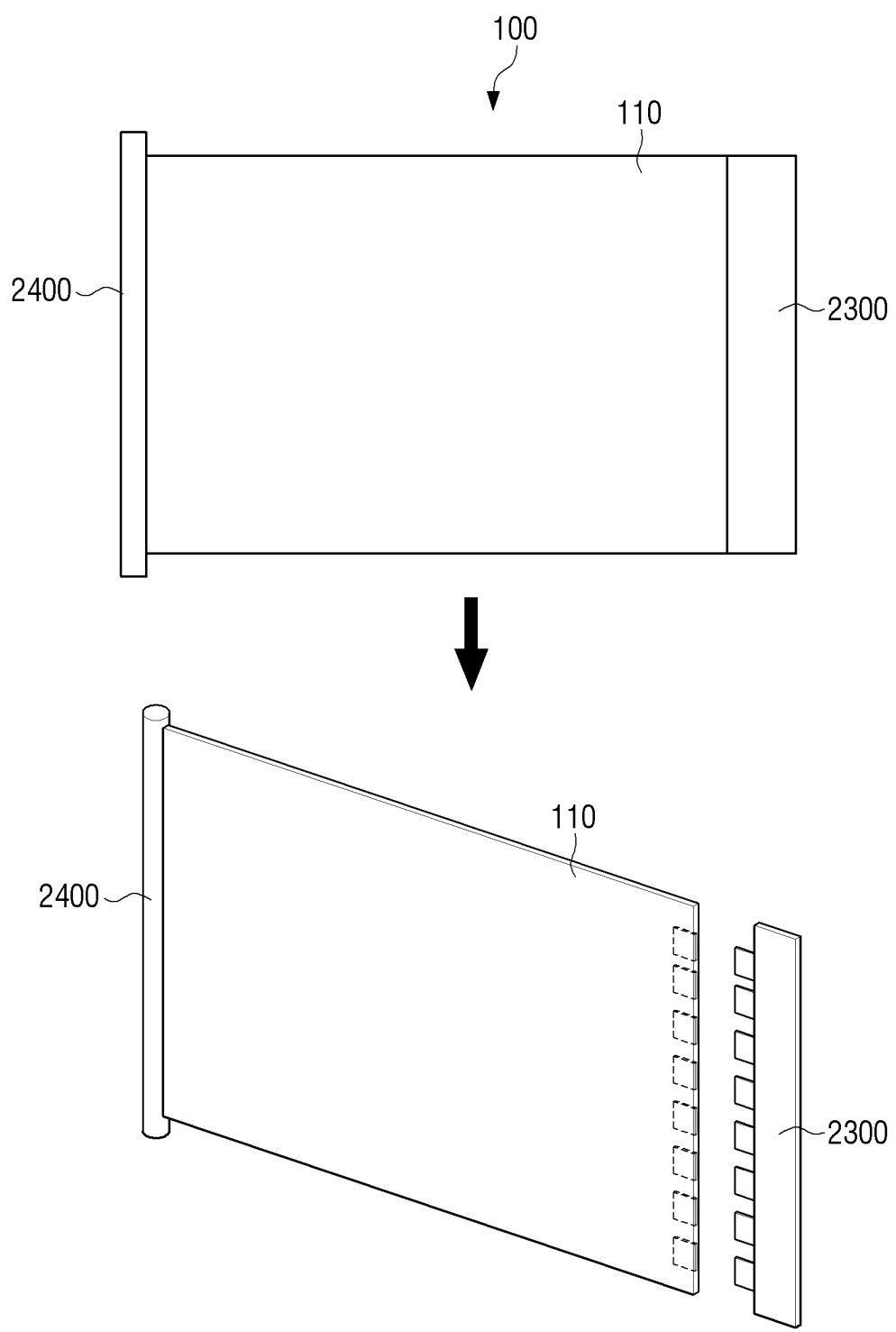
FIG. 2 shows a view illustrating a flexible display device according to another exemplary embodiment.

FIG. 2 shows a view illustrating a flexible display device according to another exemplary embodiment. According to FIG. 2, a power unit 2300 may be mounted on an edge area of a certain surface of the flexible display device 100 in a detachable manner.

The power unit 2300 may be made of a flexible material so as to be bent with the display 110. Specially, the power unit 2300 may include a cathode current collector, a cathode electrode, an electrolyte unit, an anode electrode, an anode current collector, and a sheath which covers the components.

As an example, a current collector may be made of alloy such as a titanium-nickel ally (TiNi) having great flexibility, pure metal such as copper, aluminum, and the like, a conducting material such as a pure metal coated with carbon, carbon fiber, and the like, a conducting polymer such as polypyrrole, etc.

The cathode electrode may be made of cathode electrode materials such as metals including lithium, sodium, zinc, magnesium, cadmium, hydrogen storage alloy, lead, and the like, non-metals including carbon, polymeric electrode materials including organic sulfur, and the like.

The anode electrode may be made of anode electrode materials including sulfur, metal sulfide, lithium transition metallic oxide such as $LiCoO_2$, $SOCl_2$, $MnO_2$, $Ag_2O$, $Cl_2$, $NiCl_2$, NiOOH, a polymeric electrode, etc. The electrolyte unit may be realized as a gel form using poly ethyleneoxide (PEO), polyvinylidene fluoride (PVdF), Poly(methyl methacrylate) (PMMA), silica-poly(vinyl acetate) (PVAC), etc.

The sheath may be made of a common polymer resin. For example, PVC, HDPE, and epoxy resin may be used. In addition, the sheath also may be made of any other materials which may be bent or warped freely with preventing damage of a tread-shaped battery.

Each of the anode electrode and the cathode electrode in the power unit 2300 may include a connector for being electrically connected to outside.

According to FIG. 2, the connector protrudes from the power unit 2300, and a groove corresponding to a location, a size, and a shape of the connector is formed on the display 110. Accordingly, the power unit 2300 may be engaged with the display 110 by engagement of the connector and the groove. The connector of the power unit 2300 may be connected to a power connecting pad inside the flexible display device 100 to supply power.

Meanwhile, a supporter 2400 is provided in an edge area of the other side of the flexible display device 100. Specially, the supporter 2400 may be made of a flexible material so as to be bent with the display 110, and may perform as an axis on which the display 110 is wound when the display 110 is rolled. Meanwhile, the display 110 may be rolled and wound on the power unit 2300 as the axis.

In FIG. 2, the power unit 2300 may be detachable to/from an edge area of a certain surface of the flexible display device 100, but this is only an example. That is, a location and a shape of the power unit 2300 may vary depending upon product characteristics. For example, if the flexible display device 100 has a certain thickness, the power unit 2300 may be mounted on a rear surface of the flexible display device 100. In this case, both surfaces of the flexible display device 100 may be equipped with supporters which perform as an axis on which the display 110 is wound when the display 110 is rolled.

A form of the flexible display device 110 was described above according to an exemplary embodiment. However, the shape of the flexible display device 100 illustrated in FIGS. 1 and 2 is only an example. That is, the flexible display device 100 may be realized as various forms.

Figure 3:
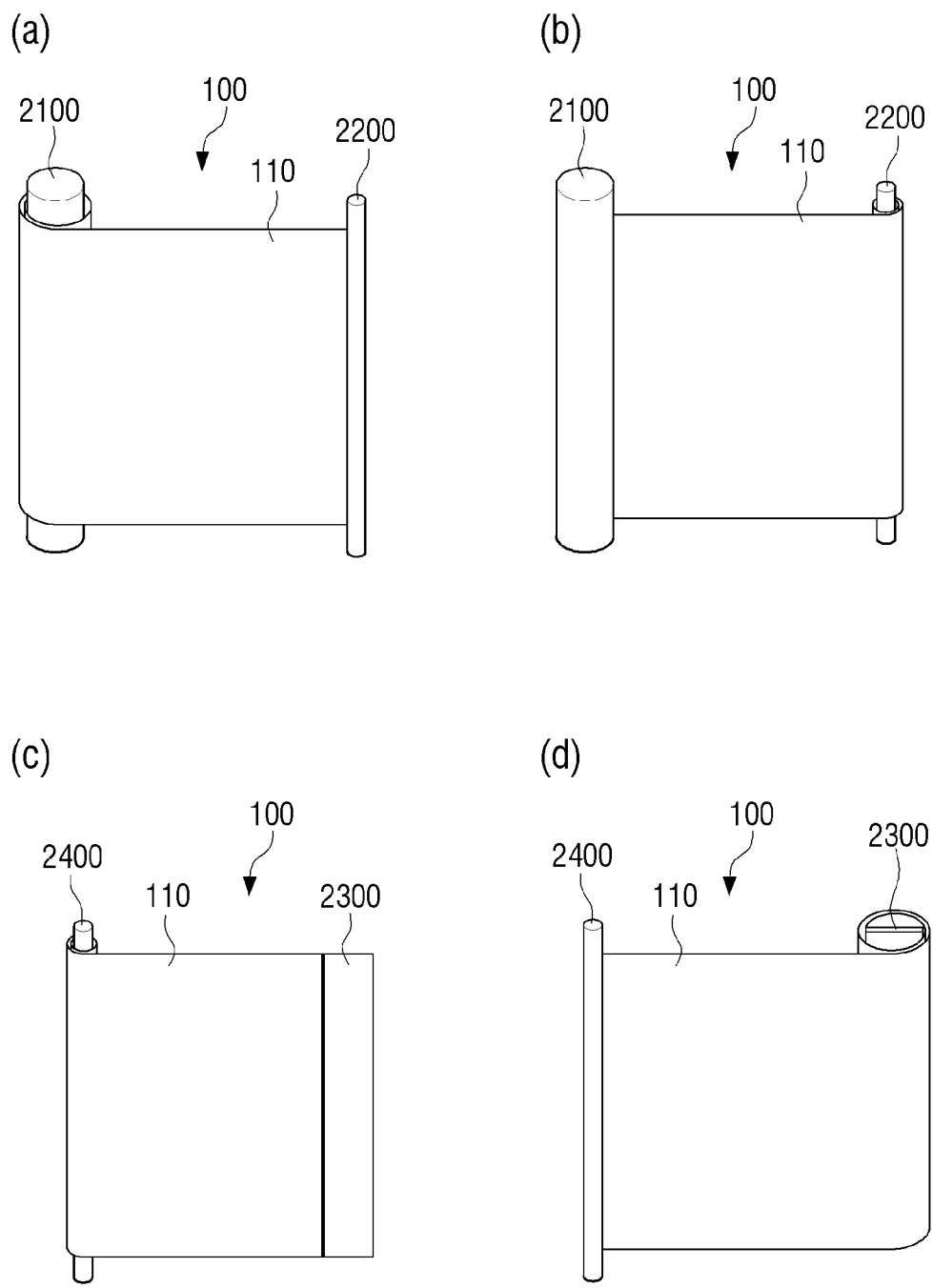
FIG. 3 shows views illustrating various rolled forms of a flexible display according to one or more exemplary embodiments.

FIG. 3 shows views illustrating various rolled forms of a flexible display according to one or more exemplary embodiments.

Herein, the flexible display device 100 includes the display 110, and thus, rolling the flexible display device 100 may signify rolling the display 110.

(a) and (b) of FIG. 3 illustrates rolling the display 110 of the flexible display device 100 having the cylindrical main body 2100. As illustrated in (a) of FIG. 3, the display 110 which comes out of the main body 2100 may be wound and rolled on the main body 2100 as the axis. In addition, as illustrated in (b) of FIG. 3, the display 110 which come out of the main body 2100 may be wound and rolled on the grip portion 2200 as the axis.

(c) and (d) of FIG. 3 illustrate rolling the display 110 of the flexible display device 100 having the power unit 2300 which is mounted on an edge area of the display. For example, as illustrated in (c) of FIG. 3, the display 110 may be wound and rolled on the supporter 2400 as the axis. Alternatively, the display 110 may be wound and rolled on the power unit 2300 as the axis.

As described above, the display 110 may be rolled in various methods. However, these are only examples, and the display 110 may be rolled autonomously without any axis according to its own characteristics.

Meanwhile, the display 110 has the characteristic of being returned to a flat state by its intrinsic flexibility when a shape of the display 110 is transformed by an external force. Accordingly, the flexible display device 100 may maintain a rolled state of the display 110 using an actuator.

The actuator may be realized as a plurality of polymer films which are disposed on a predetermined area of the display 110. That is, when a user wishes to fix the entire areas of the display 110 in a rolled state, the plurality of polymer films may be disposed over the display 110. When the user wishes to fix a part of the areas in the rolled state, the plurality of polymer films may be disposed on a part of the areas of the display 110.

A polymer film refers to a silicon-based or urethane-based dielectric elastomer. Surfaces of the polymer film are covered with electrodes, and a shape of the polymer film is transformed according to a potential difference of voltages which are applied to the respective electrodes. For example, in response to a certain level of voltage being applied to a polymer film, an upper part of the polymer film may contract and a lower part of the polymer film may expand. Accordingly, a controller 130 may apply a voltage to the polymer film which is disposed on a rolled area to maintain the rolled state of the display 110.

Figure 4:
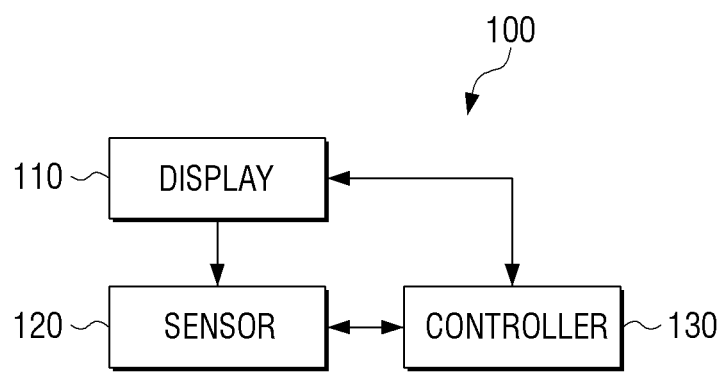
FIG. 4 is a block diagram illustrating a structure of a flexible display device according to an exemplary embodiment.

FIG. 4 is a block diagram illustrating a structure of a flexible display device according to an exemplary embodiment. According to FIG. 4, the flexible display device 100 includes the display 110, a sensor 120, and the controller 130.

The flexible display device 100 of FIG. 4 may be realized as various types of devices which may be portable and have a display function, such as a mobile phone including a smart phone, a Portable Multimedia Player (PMP), a personal digital assistant (PDA), a tablet PC, a navigator, etc. In addition, the flexible display device 100 may be realized as a stationary device such as a monitor, a TV, a kiosk, etc., as well as a portable device.

The display 110 displays various screens. For example, the display 110 may display a reproduction screen or an execution screen of content such as an image, a moving image, text, music, and the like, and may display various User Interface (UI) screens. For example, in response to various content being reproduced through various applications installed in the flexible display device 100, the display 110 may display a content reproduction screen provided by a corresponding application.

The flexible display device 100 including the display 110 has a bendable characteristic. Accordingly, the flexible display device 100 and the display 110 have a flexible structure and need to be made of a flexible material. Hereinafter, an exemplary structure of the display 110 will be described with reference to FIG. 5.

Figure 5:
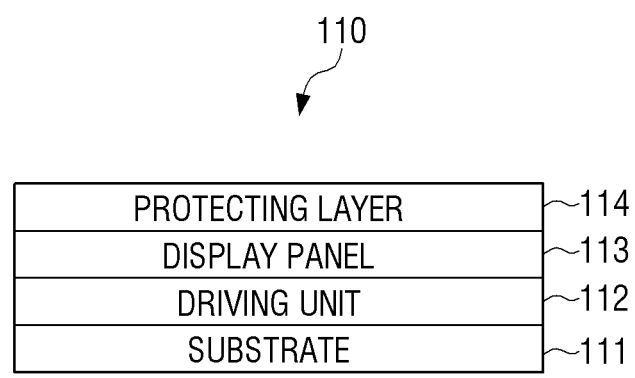
FIG. 5 is a view illustrating a structure of a display of a flexible display device according to an exemplary embodiment.

FIG. 5 is a view illustrating a structure of a display of a flexible display device according to an exemplary embodiment. According to FIG. 5, the display 110 includes a substrate 111, a driving unit 112, i.e. a driver, a display panel 113, and a protecting layer 114.

A flexible display device refers to a device which may be bent, warped, folded, or rolled like paper while maintaining display characteristics of the conventional flat-panel display device. Accordingly, the flexible display device should be mounted on a flexible substrate 111.

The substrate 111 may be realized as a plastic substrate (for example, a polymer film) which may be transformed by external pressure.

The plastic substrate has a structure where both surfaces of a base film of the substrate are coated with a barrier coating. The base film may be made of various resins such as Polyimide (PI), Polycarbonite (PC), Polyethyleneterephtalate (PET), Polyethersulfone (PES), Polythylenenaphthalate (PEN), Fiber Reinforced Plastic (FRP), etc. The barrier coating applied to opposite surfaces of the base film may be made of an organic film or an inorganic film in order to maintain flexibility.

Meanwhile, the substrate 111 may be made of other flexible materials such as thin glass or metal foil.

The driving unit 112 drives the display panel 113. The driving unit 112 may apply a driving voltage to a plurality of pixels constituting the display panel 113 and may be realized as an amorphous-silicon (a-si) thin film transistor (TFT), Low temperature poly silicon (LTPS) TFT, organic TFT (OTFT), etc. The driving unit 112 may be realized as various forms depending upon an implementation form of the display panel 113. As an example, the display panel 113 may consist of an organic luminous body which includes a plurality of pixel cells and an electrode layer which covers both surfaces of the organic luminous body. In this case, the driving unit 112 may include a plurality of transistors which respectively correspond to each of the plurality of pixel cells of the display panel 113. The controller 130 applies an electronic signal to a gate of each transistor so that a pixel cell connected to the transistor emits light. Accordingly, an image may be displayed.

Meanwhile, the display panel 110 may be also realized as an electroluminescent display (EL), electrophoretic display (EPD), electrochromic display (ECD), liquid crystal display (LCD), AMLCD, Plasma display Panel (PDP), and the like, on top of an organic light emitting diode. An LCD cannot emit light autonomously, and thus, a backlight may be equipped. An LCD which does not include a backlight, ambient light is used. Accordingly, in order for the LCD display panel 113 to be used without a backlight, certain conditions, such as an environment having sufficient light, should be satisfied.

The protecting layer 114 protects the display panel 113. As non-limiting examples, the protecting layer 114 may be made of materials such as ZrO, $CeO_2$, $ThO_2$, etc. The protecting film 114 is made in a form of a transparent film and may cover the entire surfaces of the display panel 113.

Meanwhile, unlike FIG. 4, the display 110 may be realized as electronic paper. Electronic paper refers to a display which is obtained by applying characteristics of common ink to paper. The electronic paper uses reflected light unlike the common flat-panel display. In electronic paper, a picture or texts may be changed using a twist ball or an electrophoresis which uses a capsule.

Meanwhile, in case of the display 110 which consists of transparent components, the display 110 may be realized as a display which is bendable and has transparency. For example, if the substrate 111 is made of polymer materials such as transparent plastic, the driving unit 112 is made of a transparent transistor, and the display panel 113 is made of a transparent organic light emitting layer and a transparent electrode, the display 110 may be transparent.

A transparent transistor refers to a transistor which is made by replacing opaque silicon of the conventional thin film transistor with a transparent material such as transparent zinc oxide, titanium oxide, etc. In addition, a transparent electrode may be made of a different materials such as indium tin oxide (ITO), graphene, etc. Graphene refers to a transparent material where carbon atoms are connected to each other and form a honeycombed flat structure. In addition, a transparent organic light emitting layer may be made of various materials.

As described above, a shape of the flexible display device 100 may be bent and transformed by external pressure. The shape transformation may include a case where the display is bent and a case where the display is rolled.

Bending represents a state where the flexible display device 100 is bent.

Rolling represents a state where the flexible display device 100 is rolled. A state where bending which is greater than a certain bending angle is sensed throughout a certain area may be defined as rolling. In addition, a state where a shape of a cross section of the rolled flexible display device 100 is substantially circular or oval-shaped may be defined as rolling.

However, the above descriptions regarding the shape transformation are only examples, and the shape transformation may be defined differently depending upon a type, a size, a weight, or characteristics of the flexible display device 100. For example, rolling may be defined as a state where the flexible display device 100 is bent so that the front and back surfaces of the flexible display device 100 come into contact with each other.

Figure 6:
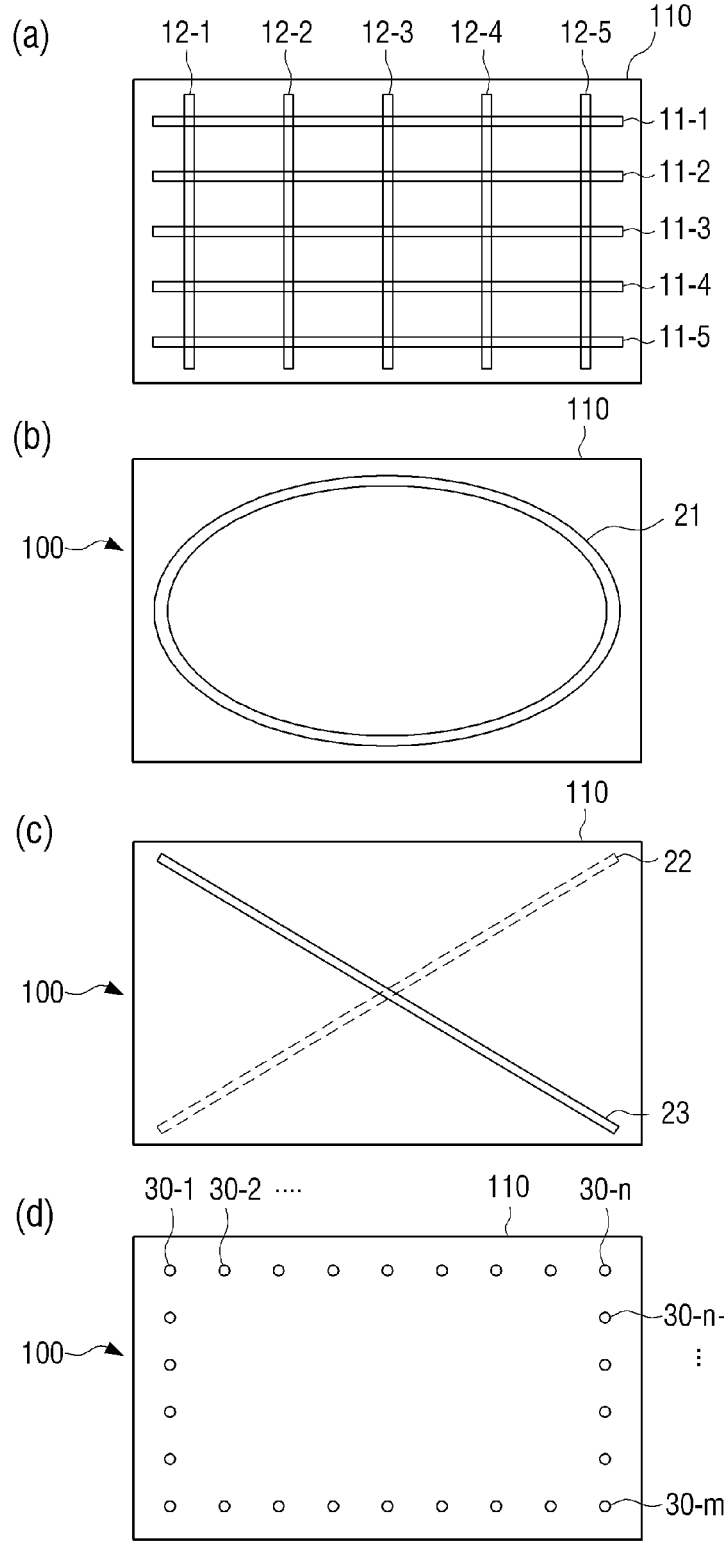
Figure 8:
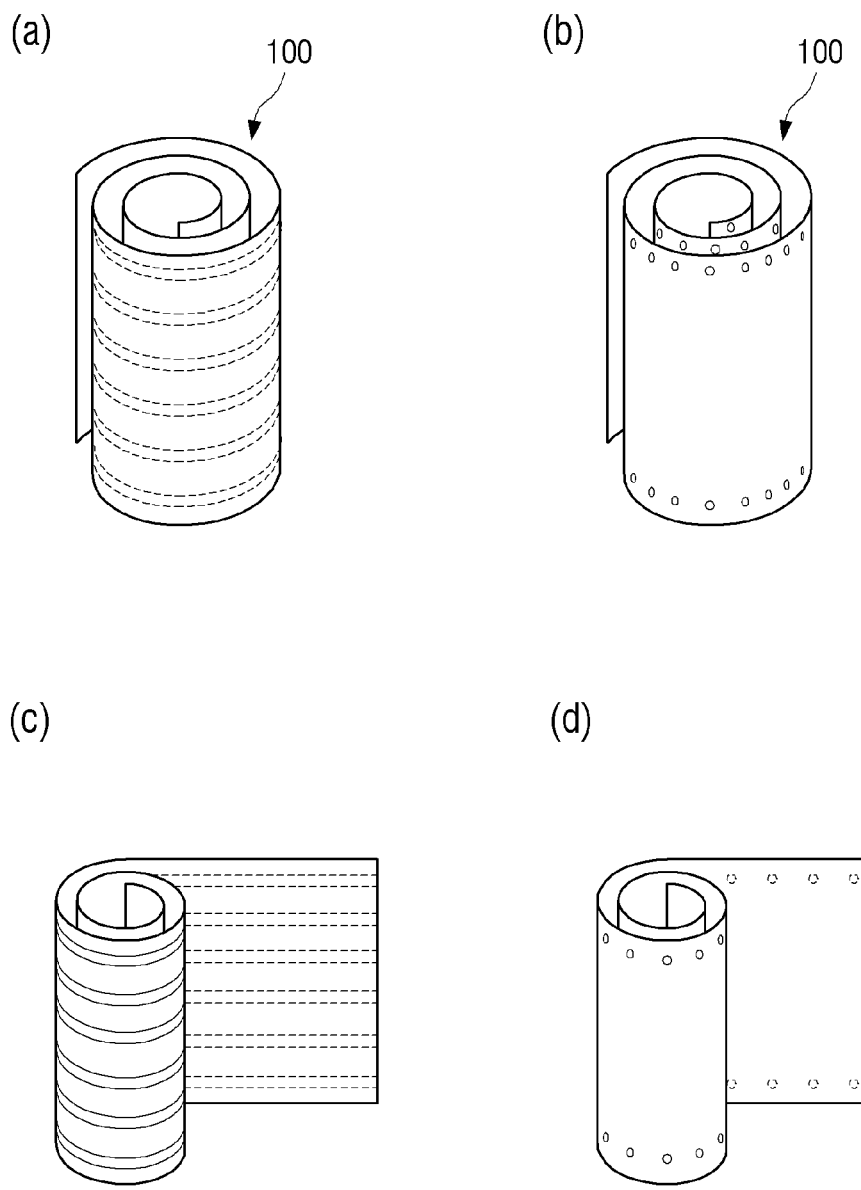

FIGS. 6 to 8 are views illustrating sensing shape transformation of a flexible display device according to one or more exemplary embodiments.

The sensor 120 senses shape transformation of the display 110. In this case, the shape transformation may include a case where the display 110 is bent or a case where the display 110 is rolled.

In response to the display 110 being rolled, the sensor 120 may sense a rolling characteristic. Herein, the display 110 may be rolled with reference to an axis. The axis, that is, a rolling axis, may be a line of extending a center of a circle formed by the display surface. In addition, the rolling characteristic may be at least one of a cross section radius, a size, a location, or a shape of an exposed area. In this case, the cross section radius may be an average value between a radius of an innermost surface and a radius of an outermost surface in the rolled state or a radius of the outermost surface. In a case of a partial rolling, the cross section radius may be a radius of a rolled area. In addition, when the display 120 includes a plurality of rolled areas, the sensor 120 may sense rolling characteristics which respectively correspond to each of the plurality of rolled areas.

In this regard, the sensor 120 may include a bend sensor which is disposed on either of a front surface or a rear surface or bend sensor which are disposed on both surfaces.

In this case, a bend sensor refers to a sensor which may be bent, and its resistance value varies depending upon a bending degree. The bend sensor may be realized as various sensors such as an optical fiber bending sensor, a pressure sensor, a strain gauge, etc.

FIG. 6 shows views illustrating arrangements of a bend sensor according to an exemplary embodiment.

(a) of FIG. 6 illustrates an example where a plurality of bar-shaped bend sensors are disposed on the display 110 in a vertical direction and a horizontal direction and form a grid pattern. The bend sensor includes bend sensors 11-1 to 11-5 which are arranged in a first direction and bend sensors 12-1 to 12-5 which are arranged in a second direction that is substantially perpendicular to the first direction. The bend sensors may be spaced apart from each other at certain intervals.

In (a) of FIG. 6, the five bend sensor 11-1 to 11-5 and the five bend sensors 12-1 to 12-5 are respectively arranged in a vertical direction and a horizontal direction, but this is only an example. That is, the number of bend sensors may vary depending upon a size or other characteristics of the display 110. Arranging the bend sensors in a vertical direction and a horizontal direction is to sense bending operations which are performed throughout the entire display 110. Accordingly, when only a part of the display has flexibility or only a bending operation of a part of the areas needs to be sensed, a bend sensor may be disposed only on the flexible part.

As illustrated in (a) of FIG. 6, the bend sensor may be embedded in a front surface of the display 110, but this is only an example. That is, the bend sensor may be embedded in a rear surface or embedded in both front and rear surfaces of the display 110.

A shape, number, and an arrangement of the bend sensor may be changed. For example, a single bend sensor or a plurality of bend sensors may be engaged with the display 110. In this case, the single bend sensor may sense a piece of bending data, or may have a plurality of sensing channels for sensing a plurality of pieces of bending data.

(b) of FIG. 6 illustrates an exemplary embodiment where a bend sensor is disposed on a surface of the display 110. As illustrated in (b) of FIG. 6, a bend sensor 21 may be disposed on the front surface of the display 110 in a circular form. However, this is only an example. The bend sensor 21 may be disposed on the rear surface of the display 110. The bend sensor 21 may be configured in alternate shapes such as a closed curve or various polygonal shapes including a square shape.

(c) of FIG. 6 illustrates an exemplary embodiment where two bend sensors are disposed on the display 110 in an intersecting manner. According to (c) of FIG. 6, a first bend sensor 22 is disposed on a first diagonal direction in the first surface of the display 110, and a second bend sensor 23 is disposed on a second diagonal direction on the second surface of the display 110.

In the above described various exemplary embodiments, examples of line-shaped bend sensors were described, but a bending operation may be sensed through a plurality of strain gauges.

(d) of FIG. 6 is a view illustrating an example where a plurality of strain gauges are disposed on the display. A strain gauge uses metal or semiconductors of which resistance varies greatly depending upon a strength of an applied force to sense transformation of a surface of an object to be measured based on the variation of the resistance. Generally, a material, such as metal, has a characteristic where resistance increases as a length increases according to an external force, and the resistance decreases as the length decreases according to the external force. Accordingly, the shape transformation of the display 110 may be sensed by sensing resistance variation.

According to (d) of FIG. 6, a plurality of strain gauges 30-1, 30-2, . . . , 30-n, . . . , 30-m, et cetera, are disposed on an edge area of the display 110. The number of the strain gauges may vary depending upon a size, a shape, sensing requirement of a predetermined bending operation, resolution, and the like of the display 110.

Hereinafter, a method of sensing the shape transformation of the display 110 using bend sensors or strain gauges which are disposed in a grid pattern by the sensor 120 will be described.

A bend sensor may be realized as an electric resistance-type sensor which uses electric resistance or a micro optical fiber sensor which uses a strain rate of an optical fiber. Hereinafter, it is assumed that a bend sensor is realized as an electric resistance-type sensor for convenience of explanation. However, it will be understood by one having ordinary skill in the art that the bend sensor may be realized using other sensors.

(a) and (b) of FIG. 7 are views illustrating sensing a bending operation in a flexible display device according to one or more exemplary embodiments.

In response to the display 110 being bent, a bend sensor which is disposed on a surface or both surfaces of the display 110 is also bent, and the bend sensor outputs a resistance value corresponding to a strength of an applied tension.

That is, the sensor 120 may sense a resistance value of the bend sensor using a level of a voltage which is applied to the bend sensor or a level of a current which flows in the bend sensor and sense a bending state in a location of the bend sensor according to a size of the resistance value.

For example, as illustrated in (a) of FIG. 7, in response to the display 110 being bent in a horizontal direction, bend sensors 41-1 to 41-5 which are embedded in the front surface of the display 110 are also bent, and a resistance value according to a level of an applied tension is outputted.

In this case, the level of tension increases in proportion to a bending degree. For example, in response to the display 110 being bent as illustrated in (a) of FIG. 7, a bending degree becomes highest at a center area 43. Accordingly, the greatest tension is applied to Point a3 of the bend sensor 41-1, Point b3 of the bend sensor 41-2, Point c3 of the bend sensor 41-3, Point d3 of the bend sensor 41-4, and Point e3 of the bend sensor 41-5 which are on the center area 43 of the respective bend sensors, and thus, the Points a3, b3, c3, d3, and e3 have the highest resistance values.

By contrast, the bending degree the lowest at the end portion. Accordingly, the bend sensor 41-1 has a resistance value which is lower than a resistance value at Point a3 on the left direction and on the right direction of Point a3. The Point a1 which is not bent and a left area thereof and Point a5 and a right area thereof have a resistance value which is the same as a resistance value before the display 110 is bent. This pattern of resistance values may be applied to the other bend sensors 41-2 to 41-5 in the same manner.

Meanwhile, the controller 130 may determine the shape transformation of the display 110 based on the sensing result of the sensor 120. For example, the controller 130 may determine a location of bending areas, a size of the bending areas, a number of the bending areas, a length of bending lines, a location of the bending lines, a number of bending lines, a direction of the bending lines, a number of bending operations, etc., based on a relation of points from which a change of resistance values is sensed.

A bending area refers to an area where the display 110 is bent and warped. The bend sensor is warped together with the display 110 by a bending operation. The bending area may be defined as all points where bend sensors output a resistance value which is different from a resistance value in an original unbent state. Meanwhile, an area with unchanged resistance values may be defined as a flat area where a bending operation is not performed.

Accordingly, when a distance between the points having a changed resistance value is within a predetermined range, the controller 130 determines that the points belong to one bending area. However, when the points are a greater distance apart, the controller 130 may classify the points into different bending areas.

As described above, in (a) of FIG. 7, the points, from Point a1 to Point a5 of the bend sensor 41-1, from Point b1 to Point b5 of the bend sensor 41-2, from Point c1 to Point c5 of the bend sensor 41-3, from Point d1 to Point d5 of the bend sensor 41-4, and from Point e1 to Point e5 of the bend sensor 41-5, have resistance values which are different from the resistance values in the original state. In this case, in the bend sensors 41-1 to 41-5, the points where the change of the resistance value is sensed are located within a predetermined distance and consecutively disposed.

Accordingly, the controller 130 senses an area 42 including Point a1 to Point a5 of the bend sensor 41-1, Point b1 to Point b5 of the bend sensor 41-2, Point c1 to Point c5 of the bend sensor 41-3, Point d1 to Point d5 of the bend sensor 41-4, and Point e1 to Point e5 of the bend sensor 41-5 as one bending area.

Meanwhile, a bending area may include a bending line. A bending line may be defined as a line that connects the points where the greatest resistance value is detected within each bending area. Accordingly, the controller 130 may determine that a line that connects the points where the greatest resistance value is detected from within each bending area as a bending line.

For example, in (a) of FIG. 7, a Line 43 that connects Point a3 which outputs the greatest resistance value in the bending sensor 41-1, Point b3 which outputs the greatest resistance value in the bending sensor 41-2, Point c3 which outputs the greatest resistance value in the bending sensor 41-3, Point d3 which outputs the greatest resistance value in the bending sensor 41-4, and Point e3 which outputs the greatest resistance value in the bending sensor 41-5 may be defined as a bending line. (a) of FIG. 7 illustrates an example where a bending line is formed in a vertical direction in a center area of a display surface.

(a) of FIG. 7 illustrates a bend sensor which is disposed in a horizontal direction from among grid-shaped bend sensors since FIG. (a) of 7 describes the display 110 being bent in a horizontal direction. That is, the sensor 120 may sense vertical bending of the display 110 using a method which is the same as in horizontal bending of the display 110, through one or more bend sensors disposed in a vertical direction. Further, in response to the display 110 being bent in a diagonal direction, the tension is applied to bend sensors disposed in a vertical direction and bend sensors disposed in a horizontal direction. Accordingly, the sensor 120 may sense diagonal bending of the display 110 based on output values of the bend sensors disposed in the vertical direction and the bend sensors disposed in the horizontal direction.

Further, the sensor 120 may sense bending of the display 110 using a strain gauge.

For example, in response to the display 110 being bent, force is applied to a strain gauge which is disposed on the edge area of the display 110, and the strain gauge outputs different resistance values depending upon a strength of the applied force. Accordingly, the controller 130 may determine a location of bending areas, a size of the bending areas, a number of the bending areas, a length of bending lines, a location of the bending lines, a number of bending lines, a direction of the bending lines, a number of bending operations, etc., based on the output values of the strain gauge.

For example, as illustrated in (b) of FIG. 7, in response to the display 110 being bent in a horizontal direction, force is applied to strain gauges 51-p to 51-p+5 and 51-r to 51-r+5 from among a plurality of strain gauges embedded in the front surface of the display 110. The strain gauges output resistance values according to the strength of the applied force. Accordingly, the controller 130 may determine that an area 52 which includes the strain gauges that output a resistance value different from a resistance value in the original state is one bending area.

In addition, the controller 130 may determine that a line that connects a plurality of strain gauges which output resistance values having a greatest difference from resistance values in the original state is a bending line. For example, according to the bending of the display 110, the controller 130 may determine that a line that connects at least two strain gauges to which the greatest force is applied or at least two strain gauges to which the greatest force and the second greatest force are respectively applied is a bending line.

For example, as illustrated in (b) of FIG. 7, in response to the display 110 being bent in a horizontal direction, the controller 130 may determine that a line 53 that connects a first strain gauge 51-p+2 and a second strain gauge 51-r+3 which output resistance values having the greatest difference from the resistance values in the original state is a bending line.

Meanwhile, in the above exemplary embodiment, the strain gauges 51-1, 51-2, et cetera, are embedded in the front surface of the flexible display device 100, which is to sense a bending operation when the flexible display device 100 is bent in a Z+ direction.

Herein, a bending direction of the flexible display device 100 may be defined as a direction where a convex area of the bent flexible display device 100 faces. That is, assuming that the front surface of the flexible display device 100 is two-dimensional (2D) x-y plane, when the convex area of the bent flexible display device 100 faces a z-direction of a z-axis which is vertical with respect to the x-y plane, a bending direction of the flexible display device 100 is a Z+ direction. When the convex area of the bent flexible display device 100 faces a z+ direction of the z-axis, the bending direction of the flexible display device 100 is a Z− direction.

Accordingly, in order to sense that the flexible display device 100 is bent in the Z− direction, one or more strain gauges may be embedded in the rear surface of the flexible display device 100, but this is only an example. That is, the strain gauge may be embedded in a certain surface of the flexible display device 100 to sense a bending operation in the Z+ direction and a bending operation in the Z− direction.

FIG. 8 shows views illustrating sensing a rolling operation of a flexible display device according to one or more exemplary embodiments.

(a) and (b) of FIG. 8 illustrate the entire display 110 being rolled. When the entire display 110 is rolled, the entire display 110 is bent over a certain curvature, and, thus, a similar strength of force is applied to the bend sensor or a strain gauges.

In addition, when the entire display 110 is bent, the front surface and the rear surface of the display 110 may come into contact with each other. Accordingly, the sensor 120 may include a touch sensor to sense the contact between the front surface and the rear surface of the display 110.

The controller 130 determines whether the display 110 is rolled. Specially, in response to the resistance values outputted from all points of the bend sensors or the strain gauges being similar to each other within a certain range greater than a predetermined value, and the front surface and the rear surface of the display 110 being in contact with each other, the controller 130 may determine that the entire display 110 is rolled.

(c) and (d) of FIG. 8 illustrate partial rolling of the display 110. When the display 110 is partially rolled, the bend sensors or the strain gauges disposed on a rolled area outputs resistance values which are similar to each other in the same manner as in when the whole display 110 is rolled. An unrolled area is in a flat state, and, thus, the unrolled area has a resistance value which is the same as in the original state. In addition, the front surface and the rear surface of the display 110 may come into contact with each other in the rolled area.

Accordingly, in response to the resistance values outputted from the bend sensor or the strain gauge disposed on an area of the display 110 being similar to each other within a certain range greater than a predetermined value and the front surface and the rear surface of the display 110 being in contact with each other in the area, the controller 130 may determine that the display 110 is partially rolled.

Meanwhile, in the above exemplary embodiment, the front surface and the rear surface of the display 110 come into contact with each other when the display 110 is rolled, but this is merely an example. That is, the front surface and the rear surface of the display 110 may not come into contact according to characteristics of the display 110 (for example, a material, a shape, a size, a thickness, etc.) even though the display 110 is rolled.

The sensor 120 may include a magnetic sensor, a magnetic field sensor, an optical sensor, a proximity sensor, and the like, instead of the touch sensor, to sense whether the front surface and the rear surface of the display 110 approach each other. Accordingly, in response to sensing that the front surface and the rear surface of the display 110 approach each other based on a sensing result of the sensor 120, the controller 130 may determine that the display 110 is rolled either entirely or partially.

The sensor 120 may sense a degree of which the display 110 is bent, that is, a bending angle. In this case, the bending angle may refer to an angle between a state where the display 110 is flat and a state where the display 110 is warped.

Figure 9:
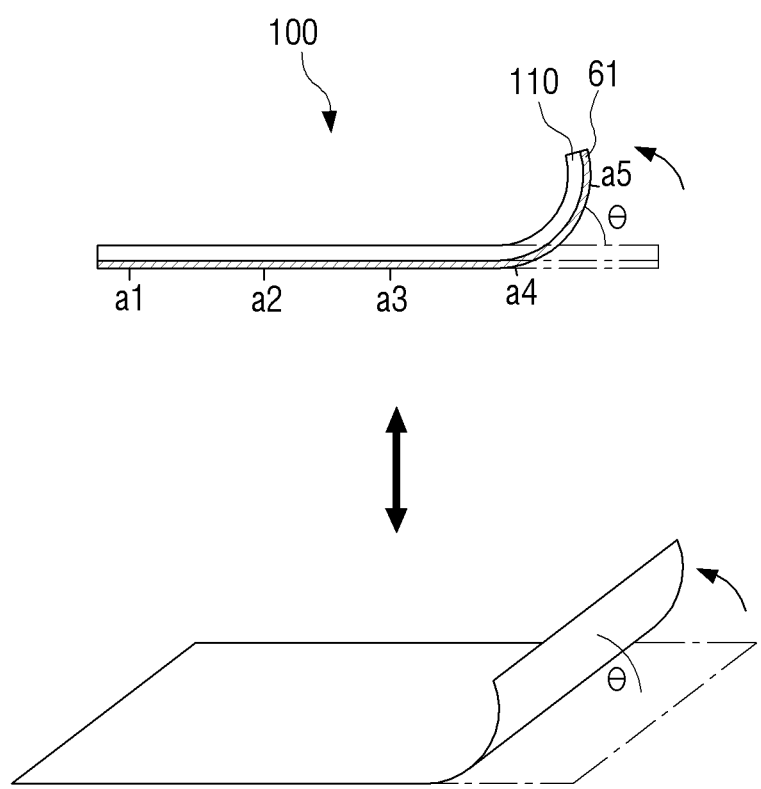
FIG. 9 shows views illustrating determining a bending angle of a display through a flexible display device according to an exemplary embodiment.

FIG. 9 shows views illustrating determining a bending angle of a display through a flexible display device according to an exemplary embodiment.

The controller 130 may determine a bending angle of the display 110 based on the sensing result of the sensor 120. For doing this, the flexible display device 100 may store resistance values which are outputted from a bending line based on bending angles of the display 110. The controller 130 may compare a resistance value outputted from a bend sensor or a strain gauge located on a bending line when the display 110 is bent with a stored resistance value to determine a bending angle of the display 110.

For example, as illustrated in FIG. 9, the display 110 is bent and Point a4 of the bend sensor located on the bending line outputs the greatest resistance value. The flexible display device 100 determines a bending angle (θ) which matches the resistance value outputted from the Point a4, using the resistance values stored in relation to bending angles.

Meanwhile, as described above, the bending direction of the display 110 may be classified into the Z+ direction and the Z− direction, and the sensor 120 may sense a bending direction of the display 110. This operations will be described below in further detail with reference to FIGS. 10 and 11.

FIG. 10 shows views illustrating sensing a bending direction using a bend sensor according to an exemplary embodiment.

The controller 130 may determine a bending direction of the display 110 based on a sensing result of the sensor 120. For doing this, the sensor 120 may include various bend sensors.

For example, as illustrated in (a) of FIG. 10, the sensor 120 may include two bend sensors 71 and 72 which overlap each other on a certain surface of the display 110. When the display 110 is bent in a certain direction, a resistance value of the upper bend sensor 71 and a resistance value of the lower bend sensor 72 are different at a point where the bending is performed. Accordingly, the controller 130 may compare the resistance values of the two bend sensors 71 and 72 at the same point and determine a bending direction.

As illustrated in (b) of FIG. 10, when the display 110 being bent in the Z+ direction, tension applied to the upper bend sensor 71 is greater than tension applied to the lower bend sensor 72 at Point A which correspond to a bending line. By contrast, when the display 110 is bent in the Z− direction, tension applied to the lower bend sensor 72 is greater than tension applied to the upper bend sensor 71.

Accordingly, the controller 130 may compare the resistance values of each of the bend sensors 71 and 72, which correspond to Point A and determine a bending direction. That is, when the resistance value outputted from the lower bend sensor is greater than the resistance value outputted from the upper bend sensor at the same point, the controller 130 may determine that the display 110 is bent in the Z+ direction. In addition, when the resistance value outputted from the upper bend sensor is greater than the resistance value outputted from the lower bend sensor at the same point, the controller 130 may determine that the display 110 is bent in the Z− direction.

In (a) and (b) of FIG. 10, two bend sensors overlap with each other in a certain surface of the display 110. However, as illustrated in (c) of FIG. 10, the sensor 120 may include bend sensors which are disposed on both surfaces of the display 110.

(c) of FIG. 10 illustrates a state where two bend sensors 73 and 74 are disposed on both surfaces of the display 110.

Accordingly, when the display 110 being bent in the Z+ direction, greater force is applied to the bend sensor 73 disposed on a first surface. By contrast, when the display 110 is bent in the Z− direction, greater force is applied to the bend sensor 74 disposed on the second surface. That is, values sensed by the two bend sensors are detected differently according to a bending direction, and the controller 130 may distinguish a bending direction according to a detection characteristic of the values.

In FIG. 10, a bending direction is sensed using two bend sensors, but this is merely an example. That is, the bending direction may be distinguished only by strain gauges disposed on a certain surface or both surfaces of the display 110.

Figure 11:
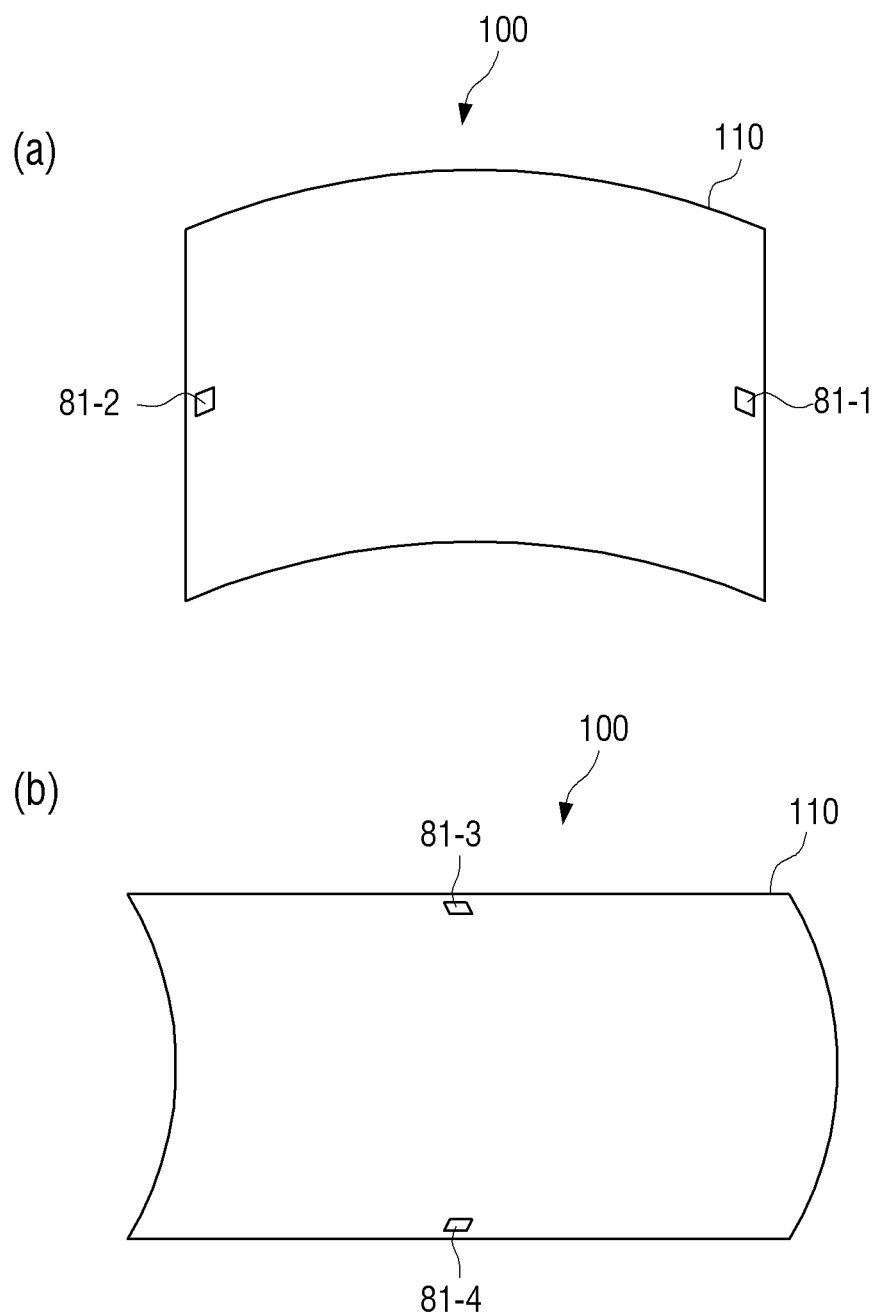
FIG. 11 shows views illustrating sensing a bending direction according to another exemplary embodiment.

FIG. 11 shows views illustrating a configuration for sensing a bending direction according to another exemplary embodiment. (a) and (b) of FIG. 11 are views describing a method of sensing a bending direction using an acceleration sensor.

The sensor 120 may include a plurality of acceleration sensors which are disposed on the edge area of the display 110. The controller 130 may determine a bending direction of the display 110 based on a sensing result of the sensor 120.

An acceleration sensor is a sensor for measuring acceleration and an acceleration direction of a movement. The acceleration sensor outputs a sensing value corresponding to gravity acceleration which varies depending upon a slope of a device to which the sensor is attached.

Accordingly, as illustrated in (a) of FIG. 11, since acceleration sensors 81-1 and 81-2 are disposed on respective edge areas of the display 110, an output value from each of the acceleration sensors 81-1 and 81-2 when the display 110 is bent is changed. The controller 130 calculates a pitch angle and a role angle using the output value which is sensed by each of the acceleration sensors 81-1 and 81-2. Accordingly, the controller 130 may determine a bending direction based on a variation degree of the pitch angel and the role angle sensed by the acceleration sensors 81-1 and 81-2.

(a) of FIG. 11 illustrates an example where the acceleration sensors 81-1 and 81-2 are disposed on the edge areas of the of the display 110 in a horizontal direction with reference to the front surface of the display 110, but the acceleration sensors may be disposed in a vertical direction as illustrated in (b) of FIG. 11. In this case, in response to the display 110 being bent in a vertical direction, the controller 130 may determine a bending direction according to measurement values sensed by each of the acceleration sensors 81-3 and 81-4 in a vertical direction.

(a) and (b) of FIG. 11 illustrate the acceleration sensors are disposed on a left edge area and a right edge area or on an upper edge area and a lower edge area of the display 110, but the acceleration sensors may be disposed on all of the upper, lower, left, and right edge areas or may be disposed on one or more corner areas.

The bending direction may be sensed through a gyro sensor or a geomagnetic sensor as well as the above described acceleration sensors. A gyro sensor is a sensor that measures the strength of the Corliolis which operates in a speed direction of a rotation movement thereby sensing an angular speed. A rotation direction may be sensed according to a measurement value of the gyro sensor, and thus, a bending direction may be also sensed. A geomagnetic sensor is a sensor of sensing azimuth using a two-axes or three-axes flux gate. In case of the geomagnetic sensor, the geomagnetic sensor disposed on each edge area of the flexible display device 100 is moved in response to the edge area being bent, and thus, outputs an electronic signal corresponding to a change of terrestrial magnetism due to the movement. The controller 130 may calculate a yaw angle using a value outputted from the geomagnetic sensor. Accordingly, various bending characteristics, such as a bending area, a bending direction, and the like, may be determined based on a variation of the calculated yaw angle.

As described above, the controller 130 may determine whether the display 110 is bent based on the sensing result of the sensor 120. The above described components of the sensor and the sensing method may be applied to the flexible display device 100 individually or in combination.

The sensor 120 may sense a user touching a screen of the display 110. In this case, the sensor 120 may include a capacitive touch sensor or a pressure-resistive touch sensor. The controller 130 may determine a coordinate of a point where the user touched the display 110 based on the electronic signal transmitted from the sensor 120.

The controller 130 controls overall operations of the flexible display device 100. Specially, the controller 130 may determine the shape transformation of the flexible display device 100 based on a sensing result of the sensor 120. The shape transformation includes bending and rolling. That is, the controller 130 may determine whether the display 110 is bent and determine a degree and a direction of bending based on a value sensed by the sensor 120. In addition, the controller 130 may determine whether the display 110 is rolled and determine a degree and a direction of rolling based on a value sensed by the sensor 120.

When the display 110 being rolled, a rolling degree of the display 110 increases in proportion to the degree of which the display 110 is rolled. Accordingly, the controller 130 may determine that the rolling degree increases as a resistance value outputted from a bend sensor or a strain sensor increases in a rolled state of the display 110.

On the other hand, the sensor 120 may include a magnetic sensor or a proximity sensor which is disposed on a flange area of the display 110 in order to sense a rolling degree of the display 110. In this case, in the rolled state of the display 110, the controller 130 may determine a proximity degree between the front surface and the rear surface of the display 110 based on a value sensed by the magnetic sensor or the proximity sensor and may determine that the rolling degree increases as the proximity degree increases.

A rolling direction refers to a direction in which the display 110 is rolled. The controller 130 may determine a rolling direction of the display 110 through a location of a bend sensor or a strain gauge which initially outputs a resistance value which is different from a resistance value in the original state when the display 110 is rolled. For example, in response to a strain gauge disposed on a left edge area with reference to the front surface of the display 110 initially outputting a resistance value different from a resistance value in the original state, the controller 130 may determine that the display 110 is rolled from the left. The controller 130 may determine a rolling direction of the display 110, for example, a left direction, a right direction, an upward direction, a downward direction, a diagonal direction, etc.

Further, the controller 130 may determine a rolling direction using an acceleration sensor disposed on an edge area of the display 110. That is, in response to the display 110 being rolled, a slope may be sensed in an acceleration sensor which is located in a rolling direction, and thus, the controller 130 may determine a rolling direction based on a value sensed by the acceleration sensors which are respectively disposed on a left side, a right side, an upper side, and a lower side of the display 110.

When the display 110 is rolled, the sensor 120 may sense an exposed area which is exposed from among the entire the display 110. Herein, the exposed area may refer to an area where a display surface of the display 110 is exposed.

According to an exemplary embodiment, a size of the exposed area may be determined based on a rolling degree. Size information on the exposed area according to the rolling degree may be stored in the flexible display device 100. The rolling degree may be determined based on a size of an output value which is outputted from a bend sensor or a strain gauge, and a size of an exposed area corresponding to the size of the outputted resistance value may be calculated and stored. For example, information indicating that when the display 110 is horizontally rolled and an output value is 'a', a display area corresponding to Length A1 in a horizontal direction is an exposed area may be stored. Accordingly, when the whole display 110 is rolled, the rolling degree is determined based on the sensing result of the sensor 120, the controller 130 may read information corresponding to the determined rolling degree from the flexible display device 100 and control to process and display an image which is suitable for the size of the exposed area.

According to another exemplary embodiment, in order to determine an exposed area according to the rolling, the sensor 120 may include touch sensors which are disposed on the front surface and the rear surface of the display 110 at certain intervals. In addition, when the display 110 is rolled, the controller 130 may determine a size and a location of the exposed area based on a sensing result of the sensor 120.

In response to the whole display 110 being rolled in a direction of an inner surface, that is, when the display 110 is rolled so that the display surface forms a concave shape, the entire areas of the display surface is covered, and thus, the exposed area does not exist.

When the whole display 110 being rolled in a direction of an outer surface, that is, when the display 110 being rolled so that the display surface forms a convex shape, the sensor 120 senses a touch between the front surface and the rear surface of the display 110 using the touch sensors in the front surface of the display 110. In this case, the controller 130 may determine that an area of which touch sensors do not come contact with the rear surface, from among the touch sensors disposed on the front surface of the display 110, is an exposed area, and determine a size and a location of the exposed area based on a size and a location of the exposed area.

In addition, in response to the display 110 being partially rolled in a direction of an outer surface, the controller 130 may determine an exposed area in the same manner as described above. That is, the controller 130 may determine that the area of which touch sensors do not come contact with the rear surface, from among the touch sensors disposed on the front surface of the display 110, is an exposed area.

In addition, in response to the display 110 being partially rolled in a direction of an inner surface, the controller 130 may determine an exposed area based on an output value sensed by a bend sensor or a strain sensor. When the display 110 is partially rolled in a direction of an inner surface, an exposed display surface is not bent. Accordingly, the controller 130 may determine that an area of which bend sensors or strain gauges output a resistance value which is the same as in the original state is an exposed area and determine a size and a location of the exposed area based on a size and a location of the area where such bend sensors or strain gauges are disposed.

In the above described exemplary embodiment, it was described that a touch sensor is used to determine an exposed area, but this is merely an example. That is, the sensor 120 may include proximity sensors or contact sensors which are disposed on the front surface and the rear surface of the display 110 at certain intervals. In addition, the controller 130 may determine an exposed area based on an output value of the proximity sensors or the contact sensors. A method of determining an exposed area using a proximity sensor or a contact sensor may be the same as the method regarding the touch sensor, and thus, the detailed description is omitted.

In response to the display 110 being rolled, the controller 130 calculates a cross section radius based on a sensing result of the sensor 120 and determines an exposed area according to the calculated radius. The cross section radius may be an average value between a radius of an innermost surface and a radius of an outermost surface or a radius of the outermost surface. In case of a partially rolled display 110, the cross section radius may be a radius of the area which is rolled.

The cross section radius is formed as the display 110 is rolled, and thus, a length of the cross section radius is affected by a rolling degree. That is, as the rolling degree increases, the cross section radius decreases, and as the rolling degree decreases, the cross section radius increases.

Accordingly, the flexible display device 100 may store a cross section radius value corresponding to the rolling degree, and the controller 130 may detect a cross section radius value that matches a resistance value outputted from a bend sensor or a strain gauge when the display 110 is rolled, thereby calculating a cross section radius value in the rolled state.

In addition, the controller 130 may determine an exposed area using the calculated cross section radius value. It is assumed that the display 110 is rolled in a horizontal direction. The controller 130 may obtain a size of an exposed area by calculating a circumference using the cross section radius value and calculating a length of the circumference and a height of the display 110. In response to the display 110 being rolled in a vertical direction, the controller 130 may obtain a size of an exposed area by calculating a circumference using the cross section radius value and calculating a length of the circumference and a width of the display 110.

The sensor 120 may sense a user grip area which is covered by a user grip manipulation in the exposed area. The user grip area refers to an area which is in contact with a part of a user body, for example, a palm, out of an area of the rolled display 110 which is exposed.

Accordingly, the sensor 120 may sense a user grip area through a sensor which is capable of sensing a user contact, such as a pressure sensor, a contact sensor, etc., in the rolled state of the flexible display device 100.

For example, the sensor 120 may include a touch sensor which senses a touch area with respect to the display. In this case, in response to a touch area which is larger than a predetermined size being sensed in the rolled state for a predetermined time, the controller 130 may determine that a touch area is a user grip area.

As another example, the sensor 120 may include a pressure sensor for sensing pressure applied to the display 110. In this case, in response to pressure which is greater than a predetermined level being sensed in the rolled state for a predetermined time, the controller 130 may determine that an area on which the pressure was sensed is a user grip area.

Figure 12:
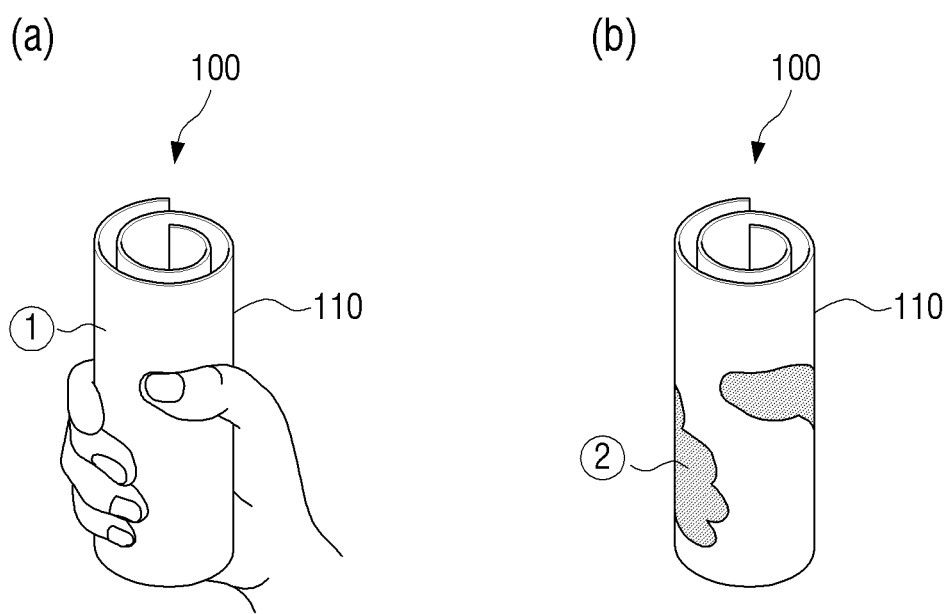
FIG. 12 shows views illustrating an exposed area and a user grip area according to an exemplary embodiment.

FIG. 12 shows views illustrating an exposed area and a user grip area according to an exemplary embodiment.

As illustrated in (a) of FIG. 12, it is assumed that the whole display 110 is rolled in a direction of the outer surface. In this case, an exposed area refers to an external area when the display 110 is rolled as in ① of (a) of FIG. 12.

In response to a user gripping the display 110 with a hand performing a rolling operation, a user grip area may be an area which is covered with the user hand. That is, as illustrated in (b) of FIG. 12, the user grip area may be Area ② which is covered, out of the exposed area in the rolled state.

In response to the exposed area and the user grip area being sensed, the controller 130 may control the display 110 to reconstruct and display a screen according to an area excluding the user grip area from the exposed area.

Specifically, the controller 130 may modify a screen so that an object displayed in the user grip area of a screen is moved to another area. Herein, the object may be a Graphic User Interface (GUI) for receiving a user command, for example, an icon, etc.

That is, in response to the display 110 being rolled, the controller 130 changes a size of a screen to correspond to a size of the exposed area sensed by the sensor 120 and display the screen in the exposed area of the display 110. Subsequently, in response to the user grip area being sensed, the controller 130 may move a location of the object displayed in the user grip area and display the object in an area other than the user grip area. That is, the controller 130 may display the object by moving the object to the other area.

FIG. 13 shows views illustrating a screen displayed in response to a user grip area being sensed in a rolled display according to an exemplary embodiment. (b) of FIG. 13 illustrates the flexible display device 100 of (a) of FIG. 13 rotated 180 degrees.

For example, as illustrated in (a) and (b) of FIG. 13, when the display 110 is rolled, a home screen 210 is displayed in the display 110 which is exposed in the rolled state. The home screen refers to a screen which displays icons corresponding to various applications installed in the flexible display device 100.

Subsequently, in response to sensing a user grip area covered by a user's hand, as illustrated in (a) and (b) of FIG. 13, icons 211, 212, 213, and 214 displayed in the sensed user grip area are moved and displayed on an area which is not covered by the user grip.

In this case, in order to move and display the objects displayed in the user grip area, the controller 130 may adjust a location of objects displayed outside the user grip area.

For example, as illustrated in (b) of FIG. 13, in order to move and display the icons 213 and 214 displayed in the user grip area to the area which is not covered by the user grip manipulation, the controller 130 may move icons 215, 216, 217, and 218 not displayed in the user grip area to the left.

In this case, the controller 130 may adjust a size of the object displayed in the area which is not covered by the user grip manipulation. That is, the controller 130 may control the size of the object and display all of the objects in the area that is not the user grip area.

Meanwhile, the controller 130 may control an animation effect that an object is pushed and gradually moved to other area by a user grip manipulation.

That is, the controller 130 may provide a graphic effect that an object displayed in the user grip area is pushed by the user's grip and moved to the area which is not covered by the user's hand. For example, the controller 130 may provide an animation effect that icons displayed in the user grip area are moved by the user grip manipulation.

Figure 14:
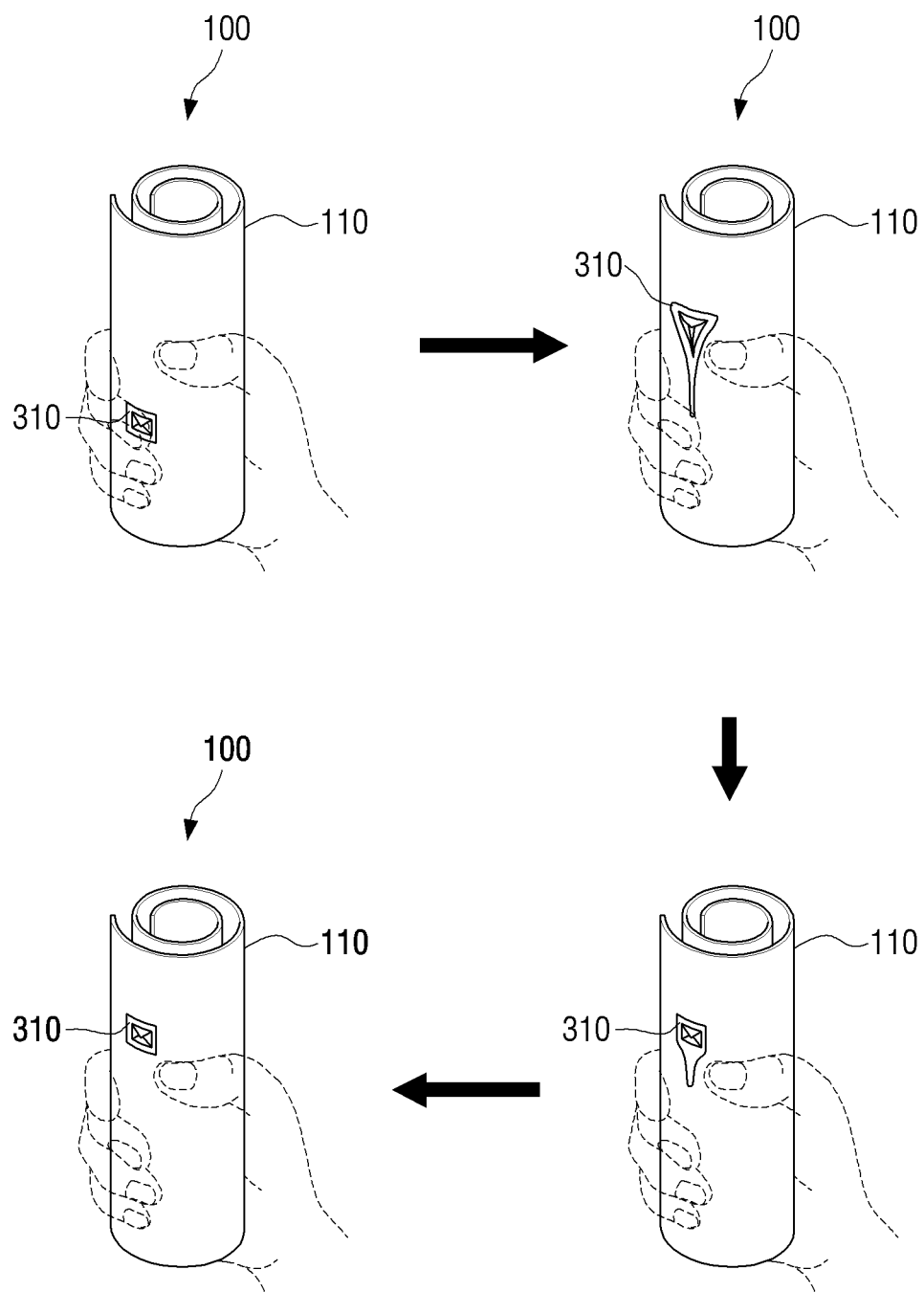
FIG. 14 shows views illustrating a screen displayed in response to a user grip area being sensed in a rolled display according to an exemplary embodiment.

FIG. 14 shows views illustrating a screen displayed in response to a user grip area being sensed in a rolled display according to an exemplary embodiment.

As illustrated in FIG. 14, when the display 110 is rolled, the exposed area of the display 110 may display an icon 310. Subsequently, when an area where the icon is displayed is covered by the user grip manipulation, the icon 310 is moved and displayed in the area which is not covered by the user's grip.

In this case, in order to express an animation effect that the icon 310 is moved, the icon 310 may be displayed in such a way that the icon 310 is pressed down and then gradually reconstructed in an original state as the icon 310 moves from the user grip area.

When the rolled state is released, the controller 130 may display a screen displayed on an area where the rolling is released out of the exposed area in an area which is newly exposed due to the release. That is, when the rolled state of display 110 is released, the controller 130 may enlarge the screen displayed prior to the release and display the screen on the newly exposed display surface.

In response to the front surface and the rear surface of the display 110 which are in contact in the rolled state being separated, the controller 130 may determine that the rolled state of the display 110 is released. In this case, the controller 130 calculates a size of the area which is newly exposed due to the release based on a size of an area of which bend sensors or strain gauges outputs a resistance value which is the same as in a flat state.

In addition, the controller 130 changes a size of the screen displayed in the display 110 in the rolled state based on the calculated size and outputs the resized screen through the display 110. That is, the controller 130 may enlarge the size of the screen displayed in the rolled state to as large as the size of the newly-exposed area and display the screen in the display 110 which is exposed area. Herein, changing a size of a screen may be changing resolution of the screen to correspond to a size of an exposed area, which may be applied in the same manner throughout the entire exemplary embodiments.

Figure 15:
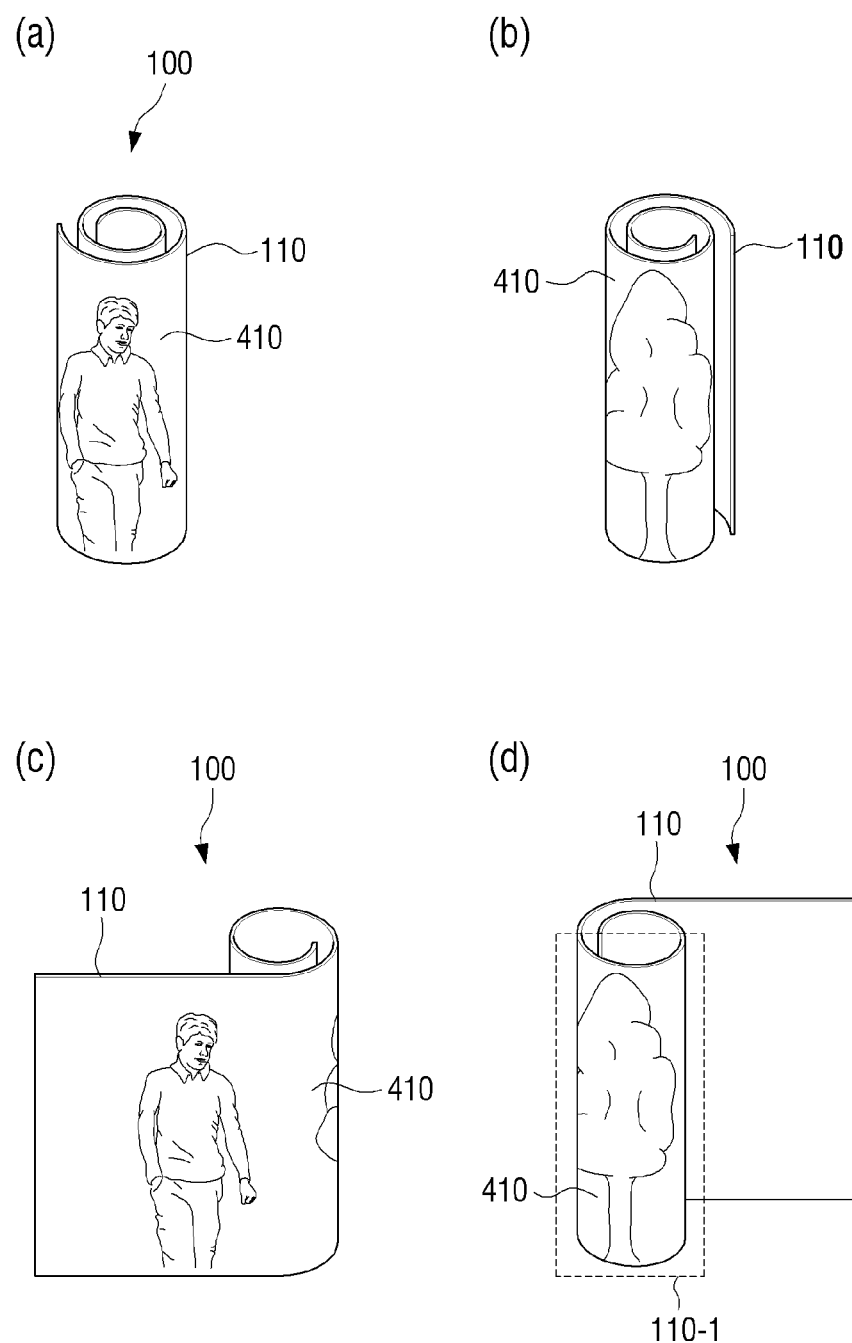
FIG. 15 shows views illustrating a screen displayed in response to rolling of a display being released according to an exemplary embodiment.

FIG. 15 shows views illustrating a screen displayed in response to rolling of a display being released according to an exemplary embodiment.

As illustrated in (a) and (b) of FIG. 15, it is assumed that an image 410 is displayed in the display 110 which is exposed in the rolled state. (b) of FIG. 15 illustrates where the flexible display device 100 of (a) of FIG. 15 rotated 180 degrees.

In response to the release, a screen may be displayed on the display 110 which is newly exposed according to the release. The flexible display device 100 may enlarge a size of the screen displayed in the display 110 in the rolled state as large as a size of an area which is in a flat state according to the release. Accordingly, as illustrated in (c) and (d) of FIG. 15, an image 410 may be displayed on an area 110-1 which is not exposed in the rolled state but exposed according to the release.

In response to the display 110 partially being rolled in the direction of the inner surface, the controller 130 may construct and display a screen in such a way that the screen corresponds to a size and a shape of the other area than an area which is bent by rolling.

In particular, in response to the display 110 being partially rolled in the direction of the inner surface, the controller 130 determines a display surface which is exposed when the display 110 is partially rolled and constructs a screen that corresponds to a size and a shape of the exposed display surface. In response to the display 110 partially being rolled in the direction of the inner surface, the exposed display surface is not bent. Accordingly, the controller 130 may determine a size and a shape of the exposed display surface based on an area where bend sensors or strain gauges output a resistance value which is the same as in a flat state.

In response to the display 110 being partially rolled in the direction of the outer surface, the controller 130 may construct and display a screen in such a way that the screen corresponds to a size and a shape of the other area than an area which is in contact with the outer surface out of the inner surface.

For example, in response to the display 110 being partially rolled in the direction of the outer surface, the controller 130 determines a display surface which is exposed according to the partial rolling and constructs a screen so as to corresponding to a size and a shape of the exposed display surface. In response to the display 110 partially being rolled in the direction of the inner surface, a part of the display 110 comes into contact with the rear surface of the display 110. Accordingly, the controller 130 may determine a size and a shape of the exposed display surface based on an area of which touch sensors are not in contact with the rear surface, from among touch sensors disposed on the front surface of the display 110.

FIG. 16 shows views illustrating displaying a screen in response to a display being partially rolled according to an exemplary embodiment.

As illustrated in (a) of FIG. 16, when the display 110 is partially rolled in the direction of the inner surface, the flexible display device 100 displays an image 511 corresponding to a size of an exposed display surface 510. In addition, as illustrated in (b) of FIG. 16, when the display 110 is partially rolled in the direction of the outer surface, the flexible display device 100 may display the image 511 to correspond to a size of an exposed display surface 520.

As described above, the flexible display device 100 may display a screen corresponding to a size of the display surface excluding a part which is covered by the partial rolling.

When a screen is displayed while the display 110 is rolled, the controller 130 may adjust a display location of the screen according to a predetermined condition. Herein, the predetermined condition may be a location of a display surface that a user watches while the display 110 is rolled.

In this case, the sensor 120 may include a camera for photographing a user, and the controller 130 may determining an area of the display 110 that the user watches. In this case, the controller 130 may trace a direction of a user face or an eyeball movement of the user to detect the area that the user watches.

For example, the controller 130 identifies an eyeball image from a user image photographed by the camera through a face modeling technique. In this case, the face modeling technique refers to an analysis process which converts a face image obtained by a photographing unit into digital information for processing and transmission one of an Active Shape Modeling (ASM) technique and an Active Appearance Modeling (AAM) technique may be used. The controller 130 may determine a movement of eyeballs using the identified eyeball image. In addition, the controller 130 may detect a direction that a user watches and compare coordinate information on a pre-stored display screen and the direction that the user watches to determine the area that the user watches.

The above described method is merely an example, and other methods may be used to determine an area that a user watches. For example, the controller 130 may trace a direction of a user face to determine an area that a user watches.

Figure 18:
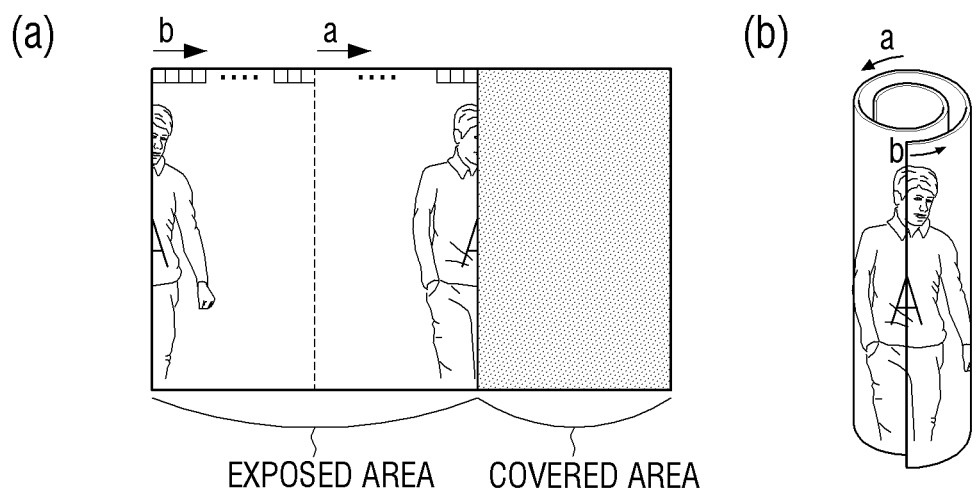
Figure 19:
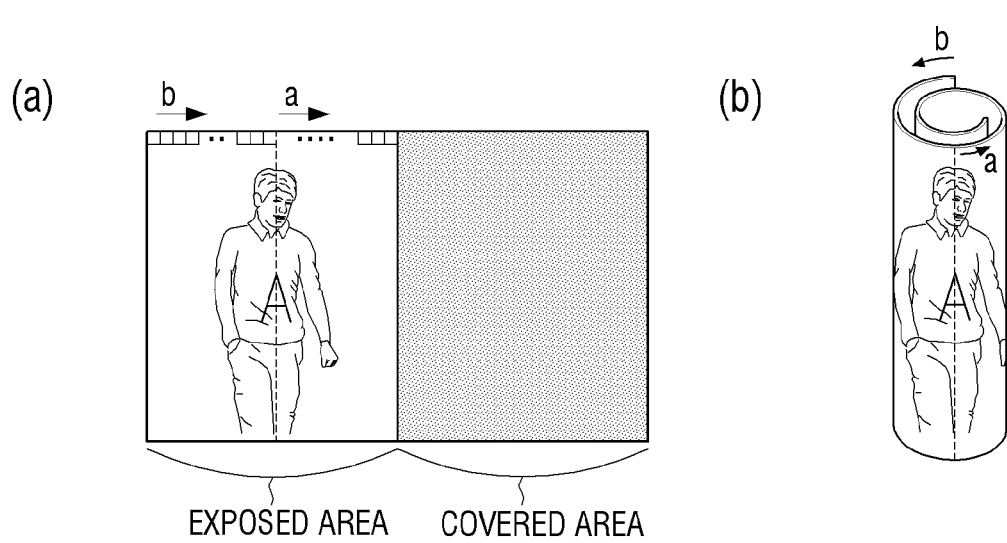

FIGS. 17 to 19 are views illustrating a method of determining a location of a screen which is displayed in a rolled state according to an exemplary embodiment.

Locations of users who watch the rolled display 110 may differ. For example, as illustrated in (a) of FIG. 17, a first user 611 may watch a boundary portion where an edge area of the display 110 is engaged with an exposed area, and, as illustrated in (b) of FIG. 17, a second user 612 may watch the display 110 on an opposite side of the boundary portion.

As described above, even though the users watch the rolled display 110 from different directions, the flexible display device 100 may locate a center of a screen to be displayed on a center of a display surface that the users watch. For doing this, the controller 130 may display a screen of which size was changed to correspond to the exposed area from an opposite side of the display surface that the users watch in the rolled state.

FIG. 18 shows views provided to describe a method of providing a user who watches a display in the same location as in (a) of FIG. 17 with a screen.

As illustrated in (a) of FIG. 18, in response to determining that a user watches a boundary portion (b) of the rolled display 110, the controller 130 may display a screen from a display surface (a) which is located in an opposite side of the boundary portion.

For example, the controller 130 displays a first pixel of a screen of which size was changed according to a size of an exposed area in a first pixel of the display 110 which is located in an opposite side of the boundary portion, and sequentially displays following pixels of the screen in a right direction. Accordingly, when reaching an edge area of the display 110, the controller 130 sequentially displays pixels to be displayed from a first pixel in the boundary portion that the user watches, in a right direction.

(b) of FIG. 18 illustrates a screen to be displayed to a user of (a) of FIG. 17. As illustrated in (b) of FIG. 17, a center of the screen is displayed on a center of the boundary portion. That is, when the display 110 being rolled, the controller 130 may display objects consecutively in the boundary portion between the edge area of the display 110 and the exposed area which is engaged with the edge area.

FIG. 19 shows views provided to describe a method of providing a user who watches a display from a location (b) of FIG. 17 with a screen.

As illustrated in (a) of FIG. 19, in response to determining that a user watches the display 110 on an opposite side from a boundary portion b of the rolled display 110, the controller 130 may display a screen from a display surface (b) which is located in the boundary portion.

Specially, the controller 130 displays a first pixel of a screen of which size was changed according to a size of an exposed area in the first pixel of the display 110 which is located in the boundary portion, and sequentially displays following pixels of the screen in a right direction.

(b) of FIG. 19 illustrates a screen to be displayed to the user of (b) of FIG. 17. As illustrated in (b) of FIG. 19, a center of the screen is displayed on a center of the area that the user watches.

As described above, the flexible display device 100 may change a location of a screen to be displayed based on a location from which a user watches the rolled display 110, but this is merely an example. That is, the flexible display device 100 may change a location of the screen to be displayed based on a direction where the display 110 is located.

For example, as illustrated in FIG. 3, in response to the display 110 being wound on a certain axis. The controller 130 may change a direction of a screen to be displayed based on a slope of the axis. To accomplish this, the sensor 120 may be realized as gravity sensor to sense a slope of the flexible display device 100 with reference to a gravity direction.

That is, in response to a slope of the axis where the display 110 is wound being the same as the gravity direction, the controller 130 displays a screen without rotation. However, in response to the slope of the axis where the display 110 is wound being different from the gravity direction by 90 degrees, the controller 130 may rotate and display the screen by 90 degrees.

In FIG. 14, a user grip area is detected as a user grips the display 110 with a hand, but this is merely an example. That is, even though the display 110 is covered by objects other than a part of a user body, the flexible display device 100 may display a screen in only an area excluding the covered area.

For example, in response to pressure which is greater than a predetermined level being sensed for a predetermined time while the display 110 is rolled, the controller 130 may determine that an area on which the pressure was sensed is an area covered by an object and display a screen in a display surface excluding the covered area. That is, the controller 130 may determine a shape and a size of an area to which pressure is not applied in an exposed display surface, reconstruct a shape and a size of a screen according to a determining result, and display the screen on the exposed display surface.

Subsequently, in response to an occurrence of a predetermined event, the controller 130 displays an object so as to overlap with the screen displayed in the display 110. In this case, the controller 130 may gradually move and display the object in the rolling direction of the display 110.

That is, in response to a message being received from an external device, the controller 130 may display texts constituting the received message on the rolled display 110. In this case, the controller 130 may display the texts by moving from a lower part to an upper part of the rolled display 110 along the rolling direction. For doing this, the flexible display device 100 may include a communication module which is capable of communicating with an external device through a mobile communication network to receive a message from the external device.

FIG. 20 shows views illustrating a screen which is displayed on a rolled display according to an exemplary embodiment.

(a) of FIG. 20 illustrates an example where the display 110 is rolled in the direction of the outer surface and fixed in a supporting fixture 720 (for example, a cup). In this case, the flexible display device 100 may display an image 710 to correspond to a size of a display surface excluding an area which is covered by the supporting fixture 720.

Subsequently, in response to a message being received, as illustrated in (b) of FIG. 20, the flexible display device 100 may display text 720 included in the message overlapping the image 710. In this case, the flexible display device 100 may display the text 720 by moving in a left direction from a lower end to an upper end of the exposed display surface.

In the above exemplary embodiment, a screen with overlapping text is displayed in response to the display 110 being help by a supporting fixture, but this is merely an example. That is, the may be displayed when the display 110 is rolled without any supporting fixture.

The sensor 120 may include a pressure sensor disposed on an edge area of the display 110. In response to pressure which is greater than a predetermined level being applied to the edge area of the display 110 over a predetermined time, the controller 130 may determine that the rolled display 110 is erected autonomously.

In this case, the controller 130 may control a screen to be displayed in a direction where a user is located using the camera. The camera may be realized so as to have a photographing angle of 360 degrees. Alternatively, a plurality of cameras may be disposed on the front surface of the display 110 at certain intervals.

The controller 130 may determine a user location in an image photographed by the camera using the face modeling technique and the like and display a screen in only a display surface which faces the determined location. For example, in case of the flexible display device 100 having a plurality of cameras, the controller 130 may control a size of a screen to be adjusted to correspond to an area where the camera which photographed a user is disposed from among the plurality of cameras and display the resized screen on a display surface where the camera is disposed.

However, this is merely an example. That is, the controller 130 may adjust a size of a screen to correspond to a size of the entire exposed areas and display the screen.

In addition, in the above exemplary embodiment, it was described that the display 110 is a single-sided display having one display surface, but this is merely an example, and the display 110 may be realized as a double-sided display having a first display surface and a second display surface which are on opposite sides of the display 110. That is, the displaying methods of FIGS. 13 to 20 may be applied to a double-sided display in a similar manner.

When the display 110 is realized as a double-sided display having a first display surface and a second display surface, the display 110 being rolled so that the first display surface forms an exposed area, and then the being released, the controller 130 may display a screen displayed on the exposed area in an area which is newly exposed on the second display surface according to the release.

For doing this, the controller 130 calculates a size of the area which is newly exposed on the second display area according to the release by using a sensing result of the sensor 120. To be specific, the controller 130 may determine an area of which bend sensors or strain gauges output a resistance value which is the same as in a flat state according to the release to calculate a size of the area which is newly exposed on the second display surface.

In addition, the controller 130 may reconstruct a size of the screen displayed in the first display surface according to the calculated size and display the resized screen on the second display surface which is newly exposed. That is, the controller 130 may display a part or all of the screen displayed on the first display surface on the second display surface which is newly exposed according to the release.

For example, the controller 130 may readjust a size of the screen displayed on the first display surface to correspond to the calculated size and display the resized screen on the second display surface. Accordingly, the entire areas of the screen displayed on the first display surface may be displayed in the second display surface which is newly exposed according to the release.

In addition, the controller 130 may readjust a size of the screen displayed on the first display surface to correspond to the size of the second display surface, and then display only a part corresponding to the size of the second display surface which is newly exposed. Accordingly, a part of the screen displayed on the first display surface may be displayed on the second display surface which is newly exposed according to the release.

Figure 21:
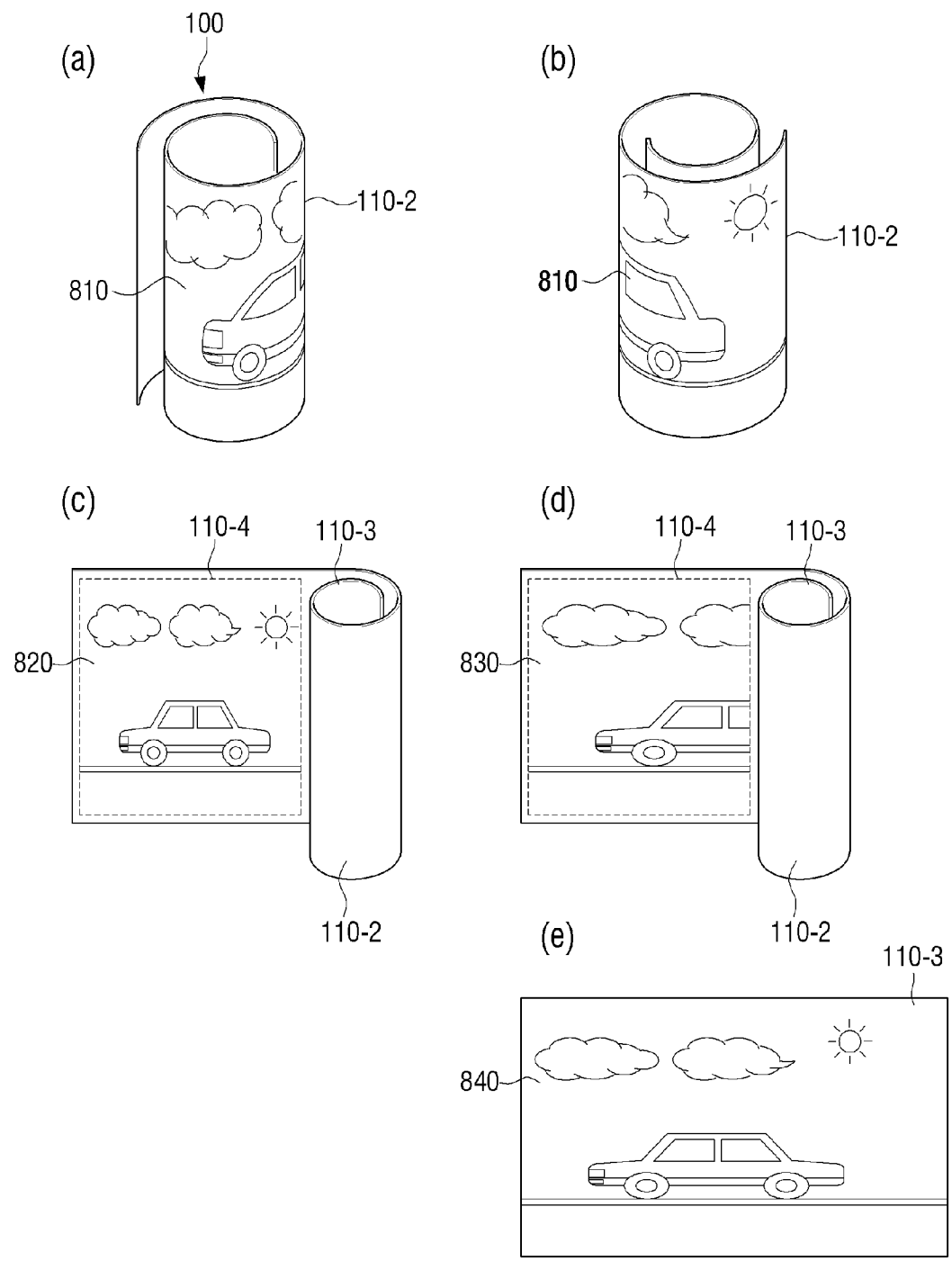
FIG. 21 shows views illustrating a screen displayed in response to a rolled state of a double-sided display being released according to an exemplary embodiment.

FIG. 21 shows views illustrating a screen displayed in response to a rolled state of a double-sided display being released according to an exemplary embodiment.

As illustrated in (a) and (b) of FIG. 21, it is assumed that an image 810 is displayed on a first display surface 110-2 which is exposed on the rolled display 110. (b) of FIG. 21 illustrates the flexible display device 100 of (a) of FIG. 20 rotated 180 degrees.

In response to the rolling being released, the image 810 displayed on the first display surface 110-2 disappears, and the image displayed in the first display surface 110-2 is displayed on a second display surface 110-3.

In this case, as illustrated in (c) of FIG. 21, a size of the image 810 displayed in the first display surface 110-2 may be reduced to correspond to a size of an area of the second display surface 110-3 which is newly exposed, and the reduced image 820 may be displayed on the newly exposed area of the second display surface 110-3.

Alternatively, as illustrated in (d) and (e) of FIG. 21, part 830 of the image may be displayed on the area 110-4 of the second display surface 110-3 which is newly exposed. When the rolled state is completely released ((e) of FIG. 21), a whole image 840 may be displayed in the second display surface 110-3.

In the above exemplary embodiments, it was described that a screen is displayed after a size of the screen is adjusted to correspond to a size of an exposed display surface in case of the partial rolling, but this is merely an example. That is, as illustrated in FIG. 21, the flexible display device 100 may display a screen at a predetermined ratio on a display surface which is exposed when the display 110 is partially rolled.

Figure 22:
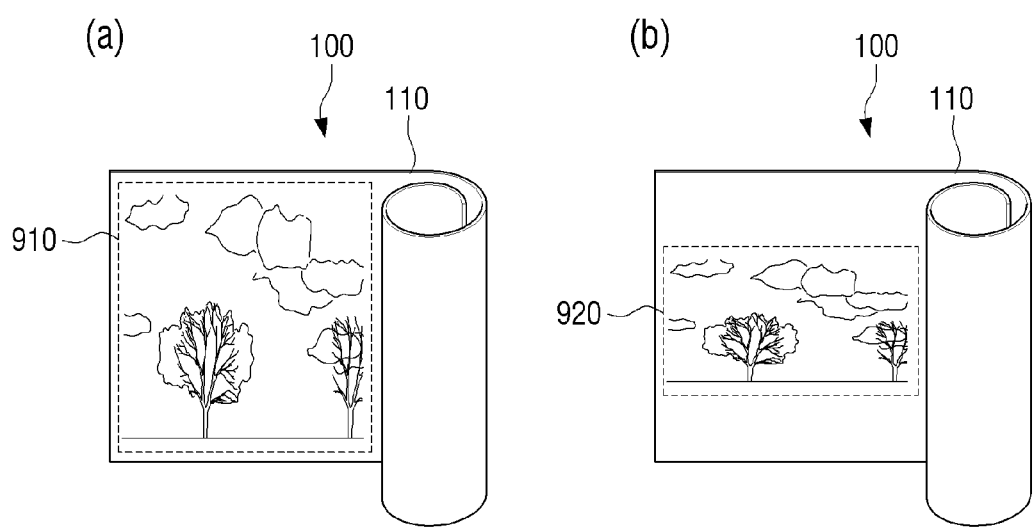
FIG. 22 shows views illustrating displaying a screen on an exposed display surface when a display is partially rolled according to an exemplary embodiment.

FIG. 22 shows views illustrating displaying a screen on an exposed display surface when a display is partially rolled according to an exemplary embodiment.

As illustrated in (a) of FIG. 22, the flexible display device 100 may adjust a size of a screen to correspond to a size of a display surface which is exposed on a partially rolled display 110 and display the resized screen. A detailed description was provided above, and thus, the overlapped description will be omitted.

In addition, the controller 130 may adjust the screen at a predetermined ratio based on a width and a height of the display surface which is exposed when the display 110 the partially rolled and display the resized screen on the exposed display surface.

For example, as illustrated in (b) of FIG. 22, it is assumed that a size (for example, resolution) of an exposed display surface is 1920*1200. When the controller 130 displays a 4:3 screen on the exposed display screen, a size of a screen to be displayed is calculated based on a size of the exposed display surface. That is, horizontal resolution is 1600 (1200*4/3) and vertical resolution is 1200, and thus, the controller 130 adjusts the screen to have a size of 1600*1200 and displays the resized screen in the exposed display surface.

The flexible display device 100 may control a quantity of objects displayed on a screen to be displayed based on the cross section radius of the rolled display 110. For example, the controller 130 may display a plurality of objects in the exposed display surface in proportion to the cross section radius of the rolled display 110. In this case, the flexible display device 100 may match and store a quantity of objects corresponding to lengths of the cross section radius of the rolled display 110, and the controller 130 may control the display 110 to display the objects of a quantity matched to the length of the calculated cross section radius of the rolled display 110.

Figure 23:
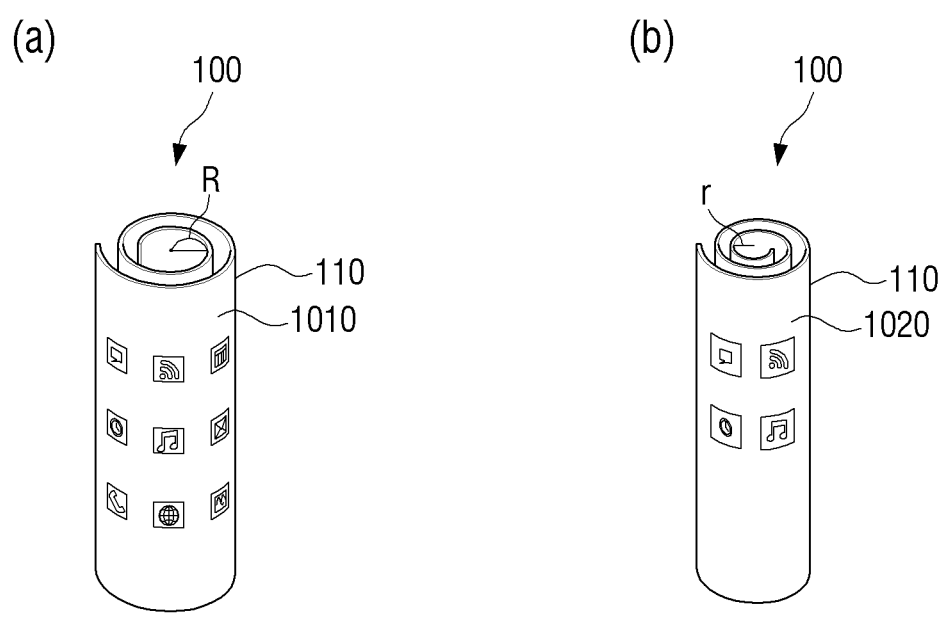
FIG. 23 shows views illustrating a screen displayed according to a cross section radius of a rolled display according to an exemplary embodiment.

FIG. 23 shows views illustrating a screen displayed according to a cross section radius of a rolled display according to an exemplary embodiment.

As illustrated in (a) and (b) of FIG. 23, the flexible display device 100 displays home screens 1010 and 1020 on the exposed display surface. The flexible display device 100 may display more icons in the home screen as the cross section radius of the rolled display 110 increases. The radius R in (a) of FIG. 23 is greater than the radius r in (b) of FIG. 23.

Further, in response to the display 110 being rolled, the controller 130 may execute a route guide function.

For example, when the display 110 is rolled while a map screen where a start point and a destination are set up is displayed, the controller 130 may set up a route from the start point to the destination and display the route on the exposed area. The controller 130 may display a rough map regarding the route or display route guide information for moving from the start point to the destination. The route guide information may include a recommended route from the start point to the destination.

The flexible display device 100 may store various map information and recommended routes. That is, the controller 130 may search for a route between two points selected on a map, extract a recommended route which matches the searched route, and display the recommended route through the display 110.

Figure 24:
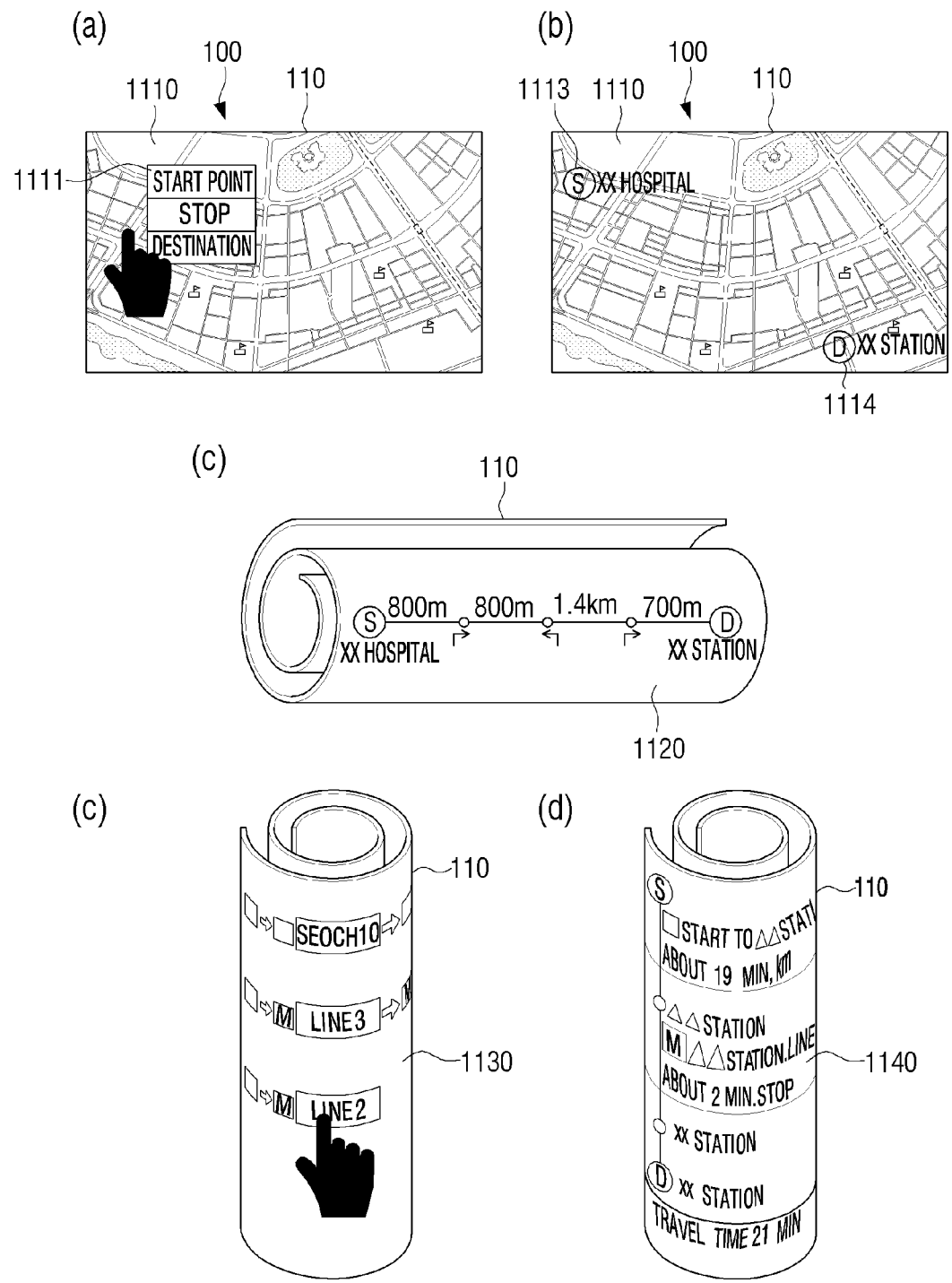
FIG. 24 shows views illustrating performing a route guide function by a flexible display device according to an exemplary embodiment.

FIG. 24 shows views illustrating performing a route guide function by a flexible display device according to an exemplary embodiment.

As illustrated in (a) of FIG. 24, in response to a user touch manipulation being received while a map screen 1110 is displayed in the display 110, a GUI 1111 for receiving a user command to set up a selected point as a start point, a stop, or a destination may be displayed. Accordingly, a user is able to set up a start point 1113 and a destination 1114 in the map screen 1110 as illustrated in (b) of FIG. 24.

Subsequently, when the display 110 is rolled, as illustrated in (c) of FIG. 24, a rough map 1120 regarding a searched route from the start point 1113 to the destination 1114 may be displayed. In this case, the rough map 1120 may be displayed along with route information for moving from the start point to the destination along the searched route (for example, a moving direction, a moving distance, etc.).

Alternatively, when the display 110 is rolled, as illustrated in (d) of FIG. 24, recommended routes 1130 for moving from the start point to the destination may be displayed. In response to one route being selected from the recommended routes 1130, detailed information 1140 for moving from the start point to the destination along the selected recommended route may be displayed ((e) of FIG. 24).

Further, the controller 130 may control the display 110 to display information on a place which exists in a direction which the rolled display 110 faces. Herein, the place may include all places that a user is able to access on foot or by using a vehicle, for example, a market, a gas station, an amusement park, a subway station, a bus stop, a museum, a historic site, a hospital, a pharmacy, a department store, an office, a condominium, etc.

For example, in response to a user pointing out a particular direction by gripping the rolled flexible display device 100, the controller 130 determines the direction pointed out by the rolled display 110 based on a sensing result of the sensor 120.

For doing this, the sensor 120 may include a geomagnetic sensor or a compass. For example, in the case of the sensor 120 including a geomagnetic sensor, the geomagnetic sensor senses an azimuth corresponding to geo magnetism. The azimuth refers to an angle from north that the rolled display 110 is rotated in a clockwise direction. In this case, the north direction may be magnetic north. Accordingly, with reference to the magnetic north, rotation in a clockwise direction may be defined as a (+) direction, and rotation in a counterclockwise direction may be defined as a (−) direction.

The controller 130 determines a place which exists in the direction pointed out by the rolled display 110 based on a current location of the flexible display device 100. For doing this, the flexible display device 100 may include a Global Positional System (GPS) module.

That is, the controller 130 may determine a point where the flexible display device 100 is located on a map based on location information obtained through the GPS module and search for a place which exists in the direction pointed out by the rolled display 110 on the map based on the determined point.

In addition, the controller 130 may display a list regarding the searched for places on the exposed area. In response to a particular place being selected from the list and then the rolling being released, the controller 130 may display detailed information on the selected particular place on the display 110. That is, the controller 130 may display a name or a business type of the searched places on the exposed area in the rolled state. Subsequently, in response to the particular place being selected from the list and then the rolling being released, the controller 130 may display a shop name, a location, or an image of the selected particular place. In this case, the detailed information is stored in the flexible display device 100. However, in a case of the flexible display device 100 including a communication module which may access to a web server through a mobile communication network, the detailed information may be received from the web server.

FIG. 25 shows views illustrating performing a route guide function by a flexible display device according to an exemplary embodiment.

As illustrated in (a) of FIG. 25, in response to a user pointing in a particular direction by gripping the flexible display device 100 in a rolled state ((a) of FIG. 25), a list regarding places which exist in the direction pointed out by the rolled display 110 is displayed ((b) of FIG. 25). Subsequently, in response to a certain place being selected from the list and then the rolling being released, detailed information on the selected place may be displayed ((c) of FIG. 25).

For example, as illustrated in (b) of FIG. 25, a list 1220 including the places which exist in the direction pointed to by the rolled display 110, for example, a XX restaurant, an A pharmacy, a ○○ convenience store, and a B cafe, is displayed on the exposed area of the display 110. Subsequently, in response to the 'XX restaurant' being selected by a touch manipulation and then the rolling being released, detailed information screen 1230 including a shop name, a location, and an image of the 'XX restaurant' may be displayed on the display 110 ((c) of FIG. 25).

Figure 26:
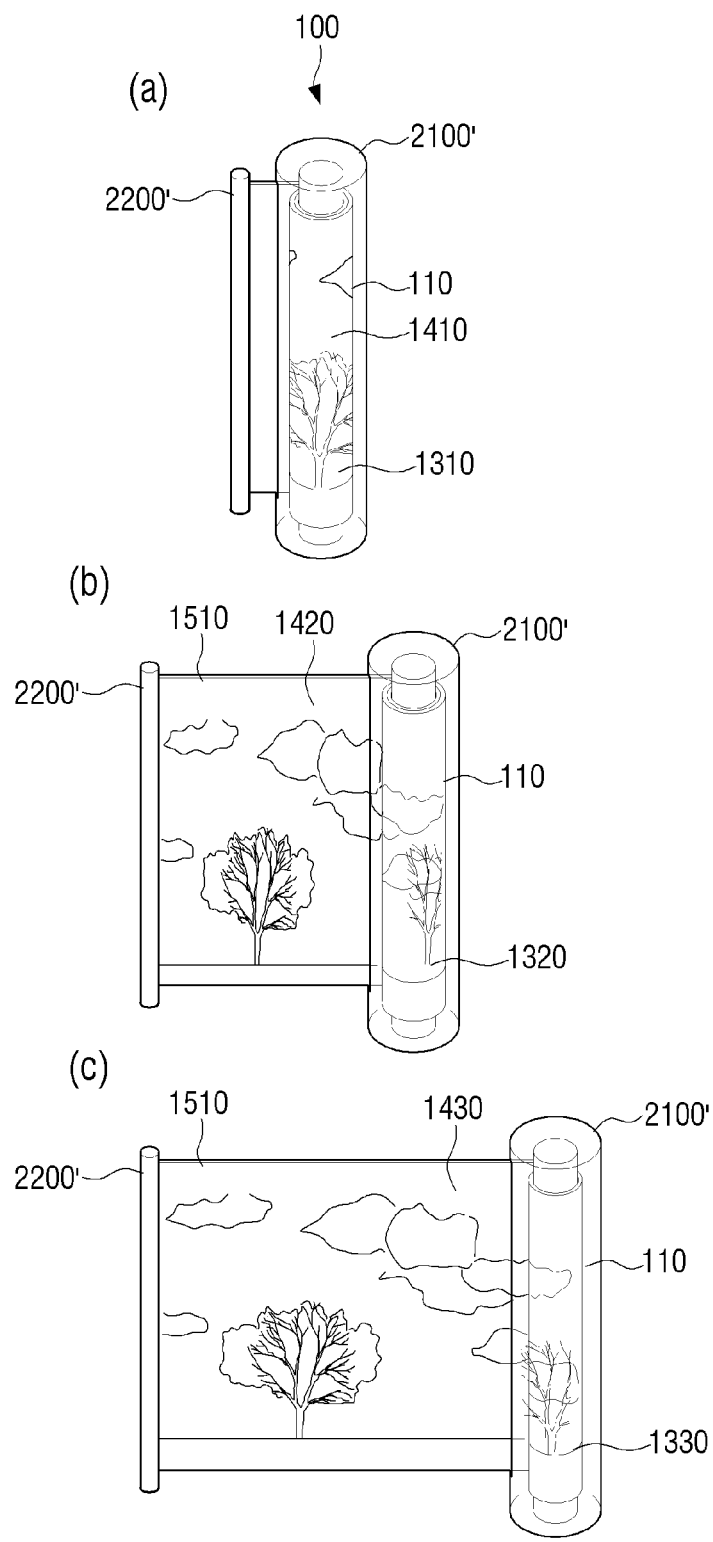
FIG. 26 shows views illustrating displaying a screen by a flexible display device having a transparent cylindrical main body according to an exemplary embodiment.

As illustrated in FIG. 1, the flexible display device 100 has the main body 2100 having a cylindrical structure, and thus, the display 110 may be rolled and stored inside the main body 2100. As illustrated in FIG. 26, a main body 2100' having a cylindrical structure may be made of a transparent material.

FIG. 26 shows views illustrating displaying a screen by a flexible display device having a transparent cylindrical main body according to an exemplary embodiment. In particular, in FIG. 26, the cylindrical main body may be made of a transparent material.

As illustrated in (a) of FIG. 26, when the cylindrical main body 2100' is made of a transparent material, the flexible display device 100 may display a screen when the display 110 is stored in the main body 2100'. The display 110 may be realized as a double-sided display having a first display screen and a second display screen facing opposite directions.

While the display 110 is in the main body 2100', the controller 130 calculates a cross section radius of the display 110 which is rolled inside the main body 2100' and determines a size of the exposed area of the display 110 which is rolled inside the main body 2100' based on the calculated cross section radius. Herein, the exposed area may be on the first display surface. In addition, the controller 130 adjusts a size of a screen to correspond to the calculated size of the exposed area and displays the resized screen on the exposed first display surface. Accordingly, as illustrated in (a) of FIG. 26, an image 1410 may be displayed on an exposed first display surface 1310.

In response to the display 100 being unrolled and coming out of the main body 2100', the controller 130 calculates a size of the second display surface which is exposed. In addition, the controller 130 calculates a cross section radius of the display 110 which is still rolled inside the main body 2100' and calculates a size of the first display surface which is exposed inside the main body 2100'.

Subsequently, the controller 130 adjusts a size of the screen based on the calculated size of the display surface and displays the resized screen on the first display surface and on the second display surface. That is, the controller 130 displays the screen on only a portion of the second display surface which is exposed and the portion of the first display surface which is located in a direction of the second display surface which is also exposed.

Accordingly, the controller 130 calculates a size of the first display surface which is located in the direction of the second display surface by dividing the horizontal resolution or the vertical resolution of the first display surface in half, adds the calculated size to the calculated size of the second display surface, and determines a size of a screen to be displayed.

That is, as illustrated in (b) of FIG. 26, in response to the display 110 being rolled and the display 110 coming out of the main body 2100', the flexible display device 100 calculates a size of an exposed second display surface 1510 and the size of the first display surface which is located in the same direction as the exposed second display surface 1510 and adjusts a size of an image to correspond to the calculated sizes. Accordingly, a resized image 1420 may be displayed on the exposed second display surface 1510 and the first display surface which is located in the same direction as the second display surface 1510.

In addition, as illustrated in (c) of FIG. 26, in response to the display 110 further coming out of the main body 2100', the flexible display device 100 may display a resized image 1430 in an exposed second display surface 1520 and a first display surface 1330 which is located in the same direction as the second display surface 1520, in the same manner as described above.

Figure 27:
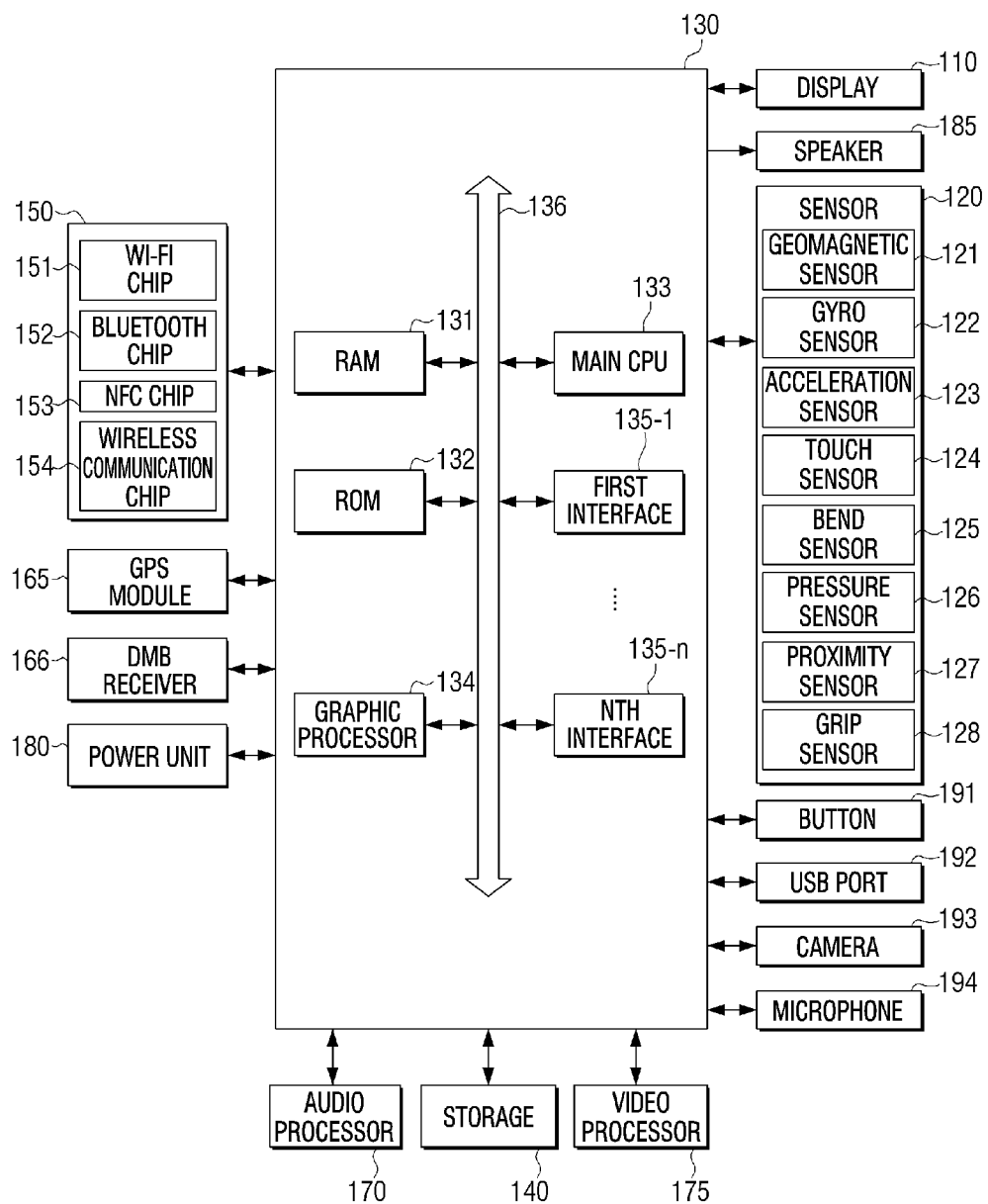
FIG. 27 is a block diagram illustrating a flexible display device according to an exemplary embodiment.

FIG. 27 is a block diagram of a flexible display device according to an exemplary embodiment. According to FIG. 27, the flexible display device 100 further includes a storage 140, a communication unit 150, i.e., a communicator, a transceiver, or an input/output (I/O) interface, a GPS receiver 165, a Digital Multimedia Broadcasting (DMB) receiver 166, an audio processor 170, a video processor 175, a power unit 180, a speaker 185, a button 191, a Universal Serial Bus (USB) port, a camera 193, and a microphone 194, on top of the components illustrate in FIG. 4.

The sensor 120 includes a geomagnetic sensor 121, a gyro sensor 122, an acceleration sensor 123, a touch sensor 124, a bend sensor 125, a pressure sensor 126, a proximity sensor 127, and a grip sensor 128. The sensor 120 may sense various manipulations such as touch, rotation, tilting, pressure, access, and the like with respect to the flexible display device, on top of a bending manipulation and a rolling manipulation.

The geomagnetic sensor 121 senses a rotation state and a moving direction of the flexible display device 100. The gyro sensor 122 senses a rotation angle of the flexible display device 100. The sensor 120 may include both of the geomagnetic sensor and the gyro sensor, but the flexible display device 100 may sense a rotation state even though only one of the geomagnetic sensor and the gyro sensor is provided. Further, the geomagnetic sensor 121 may sense a direction pointed out by the rolled display 110 with reference to the magnetic north.

The acceleration sensor 123 senses a slope of the flexible display device 100. In addition, the acceleration sensor 123 may be used to sense a bending characteristic, such as a bending direction or a bending area of the flexible display device 100, or a rolling characteristic such as a rolling direction, etc., of the flexible display device 100.

The touch sensor 124 may be realized as a capacitive type sensor or a pressure-resistive type sensor. The capacitive type refers to a method of sensing micro electricity which exits into a user's body in response to a touch of a part of the user's body with respect to a surface of the display 210, thereby calculating a touch coordinate. The pressure-resistive type refers to a method of embedding two electrode plates into the display 210, and in response to a user touch with respect to a screen, sensing a current which flows as two electrode plates embedded in the display 210, that is, an upper plate and a lower plate on the touched point contact each other, thereby calculating a touch coordinate. As described above, the touch sensor 124 may be realized in various forms.

As described above, the bend sensor 125 may be realized in various forms and numbers to sense a bending state and a rolled state of the flexible display device 100. The various examples of the components and operations of the bend sensor 125 were provided above, and thus, the overlapped description will be omitted.

The pressure sensor 126 senses a level of pressure which is applied to the flexible display device 100 when a user performs a touch or bending manipulation and provide the controller 130 with the sensing result. The pressure sensor 126 may include a piezo film which is embedded in the display 110 and outputs an electronic signal corresponding to the level of pressure. Meanwhile, FIG. 27 illustrates the touch sensor 124 and the pressure sensor 126 as individual components, but, in case of the touch sensor 124 being realized as a pressure-resistive type touch sensor, the pressure-resistive type touch sensor may perform a role of the pressure sensor 126.

The proximity sensor 127 senses a motion which approaches a display surface without direct contact. The proximity sensor 127 may be realized as various types of sensors such as a high-frequency oscillation-type proximity sensor which forms a high-frequency magnetic field to sense a current induced by a characteristic of the magnetic field which varies when an object approaches, a magnetic type proximity sensor which uses a magnet, a capacitive type proximity sensor which senses capacitance that varies due to an approach of an object, etc. Specially, the proximity sensor 127 may be disposed on an edge area of the display 110 and used to sense a rolling degree of the rolled display 110.

The grip sensor 128 is disposed on a flange or a handle portion of the flexible display device 100 separately from the pressure sensor 126 to sense a user grip manipulation. The grip sensor 128 may be realized as a pressure sensor or a touch sensor.

The controller 130 analyzes various sensing signals sensed by the sensor 120 to determine a user intention and perform an operation corresponding to the intention. That is, as described above, the controller 130 may determine whether the display 110 is rolled or whether the rolling of the display 110 is released based on the sensing result of the sensor 120 and perform a corresponding operation.

Further, the controller 130 may perform a control operation according to various input methods such as a touch manipulation, a motion input, a voice input, a button input, etc. The touch manipulation may include various types of manipulation such as simple touch, tap, touch and hold, move, flick, drag and drop, pinch-in, pinch-out, etc.

For example, the controller 130 may execute an application stored in the storage 140 and construct and display an execution screen of the application. In addition, the controller 130 may reproduce various content stored in the storage 140. Herein, the content may refer to various multimedia content such as an image, text, a picture, a moving image, etc. Further, the controller 130 may communicate with external devices through the communication unit 150.

The communication unit 150 communicates with various types of external devices according to various types of communication methods. The communication unit 150 includes a Wireless-Fidelity (Wi-Fi) chip 151, a Bluetooth chip 152, a Near Field Communication (NFC) chip 153, and a wireless communication chip 154. The communication unit 150 may receive/transmit contents from/to various types of external devices through the above described components.

The Wi-Fi chip 151, the Bluetooth chip 152, and the NFC chip 153 perform communication according to a Wi-Fi method, a Bluetooth method, and an NFC method, respectively. The NFC chip 153 refers to a chip which operates according to an NFC method which uses a 13.56 MHz band among various Radio Frequency-Identification (RF-ID) frequency bands such as 135 kHz, 13.56 MHz, 433 MHz, 860~960 MHz, 2.45 GHz, and so on. In the case of the Wi-Fi chip 151 or the Bluetooth chip 152, various connection information such as Subsystem Identification (SSID) and a session key may be transmitted/received first for establishing a communication connection and then various information may be transmitted/received. The wireless communication chip 154 refers to a chip which performs communication according to various communication standards such as Institute of Electrical and Electronics Engineers (IEEE), Zigbee, 3rd Generation (3G), 3rd Generation Partnership Project (3GPP), Long Term Evolution (LTE), and so on. In particular, the wireless communication chip 154 may access a web server through a mobile communication network.

The GPS module 165 receives a GPS signal from a GPS satellite and obtains a current location of the flexible display device 100. The GPS module 165 may receive a GPS signal from a satellite and generate location information including latitude, longitude, and altitude of the current location of the flexible display device 100. The GPS module 165 receives signals transmitted from a plurality of GPS satellites and calculates a distance between the satellite and a receiver using a time difference between a transmitting time and a receiving time. Then, the GPS module 165 considers the calculated distance between each of the plurality of satellites and a location of the satellites and obtains the current location of the flexible display device using a method such as trilateration.

The DMB receiver 166 receives and processes a DMB signal.

The storage 140 may store various information on bending and rolling of the flexible display device 100. For example, the storage 140 may store information on resistance values which are outputted along a bending line according to bending angles of the display 110, size information of an exposed area according to a rolling degree, etc.

The storage 140 may include at least one type of storage medium from among a flash memory type, a hard disk type, a multimedia card micro type, a card-type memory (for example, a SD memory or an XD memory), a Random Access Memory (RAM), and a Read-Only Memory (ROM).

In this case, each storage medium may be made of a flexible material, but not limited thereto.

The power unit 180 supplies power to the components in the flexible display device 100. The power unit 180 may include an anode current collector, an anode electrode, an electrolyte unit, a cathode electrode, a cathode current collector, and a sheath which covers the components. The power unit 180 may be realized as a secondary cell which is chargeable and dischargeable. In case of the flexible display device including the cylindrical main body 2100 as illustrated in FIG. 1, the power unit 180 may be embedded in the main body 2100. In addition, in case of the flexible display device being realized as a form illustrated in FIG. 2, the power unit 180 may be attached on a certain surface of the display 110 along with a power unit 2300 of FIG. 2 and realized as a flexible form so as to be bent together with the flexible display device 100. The current collectors, the electrodes, and the sheath may be made of a flexible material.

The audio processor 170 processes audio data. The audio processor 170 may perform various processing operations such as decoding, amplifying, noise filtering, and the like with respect to audio data.

The video processor 175 processes video data. The video processor 175 may perform various image processing operations such as decoding, scaling, noise filtering, frame rate conversion, resolution conversion, and the like with respect to video data. The video processor 175 may scale a screen or change a resolution of the screen to correspond to a size of an exposed area of the rolled display 110. In addition, in response to the rolling being released, the video processor 175 may scale a screen or change resolution of the screen to correspond to a size of an exposed area which newly appears in the display 110 according to the release.

The display 110 may display various screens or objects according to the control of the controller 130. For example, the display 110 may signal-process various images, texts, pictures, and moving images stored in the storage to be a form which may be displayed by the display 110 through the audio processor 170 and the video processor 175 and display the processed images, texts, pictures, and moving images on the display 110. In addition, the controller 130 may display a GUI for receiving various user commands on the display 110.

The speaker 185 outputs various notification sounds, voice messages, and the like, as well as the audio data processed by the audio processor 170.

The button 191 may be realized as various types of buttons such as mechanical buttons, a touch pad, a wheel, and the like, which are mounted on the display device 100, for example a front surface, a side surface, and a rear surface on an appearance of the main body of the flexible display device 100. The button 191 may receive various user manipulations for controlling operations of the flexible display device 100. The user manipulations may include a power turning on/off command, etc.

The USB port 192 refers to a port to which a USB memory or a USB connector may be connected. Various contents may be received/transmitted from/to an external device through the USB port 192.

The camera 193 photographs a still image or a moving image according to the control of a user. The camera 193 may be mounted on the front surface and the rear surface of the flexible display device 100. In addition, the camera 193 may photograph a user who watches the rolled display 110. In this case, a photographing angle of the camera 193 may be 360 degrees.

The microphone 194 receives a user voice or other sounds and converts the user voice and other sounds into audio data. The controller 130 may use the user voice inputted through the microphone 194 in a call process. In addition, the controller 130 may convert the user voice into audio data and store the audio data in the storage 140.

If the flexible display device 100 includes the camera 193 and the microphone 194, the controller 130 may perform a control operation according to a user voice inputted through the microphone 194 or a user motion recognized through the camera 193. That is, the flexible display device 100 may operate in a motion control mode or a voice control mode.

For example, the motion control mode, the controller 130 performs control operations including photographing a user by activating the camera 193, turning on/off power by tracing a motion change of the user, etc. In addition, the voice control mode, the controller 130 may operate in a voice recognition mode which analyzes a user voice inputted through the microphone and performs a control operation according to the analyzed user voice.

On top of the above, the flexible display device 100 may further include various external input ports for connecting various external terminals such as a headset, a mouse, a Local Area Network (LAN), etc.

The above described operations of the controller 130 may be performed by a program stored in the storage 140. The storage 140 may store various data such as operating system (O/S) software for driving the flexible display device 100, various applications, various data which are inputted or set up while an application is executed, content, etc.

The controller 130 controls the overall operation of the flexible display device 100 using various programs stored in the storage 140.

For example, as illustrated in FIG. 27, the controller 130 includes a Random Access Memory (RAM) 131, a Read-Only Memory (ROM) 132, a main Central Processing Unit (CPU) 133, a graphic processor 134, first to n interfaces 135-1 to 135-n, and a bus 136.

The RAM 131, the ROM 132, the main CPU 133, and the first to n interfaces 135-1 to 135-n may be connected to each other through the bus 136.

The first to n interfaces 135-1 to 135-n are connected to the aforementioned various components. One of the interfaces may be a network interface which is connected to an external apparatus through a network.

The main CPU 133 accesses the storage 140 and performs a booting operation using the O/S stored in the storage 140. In addition, the main CPU 294 performs various operations using various programs, contents, and data stored in the storage 140.

The ROM 132 stores a set of commands for system booting. In response to a turn-on command being input and power being supplied, the main CPU 132 copies the O/S stored in the storage 140 to the RAM 131 according to a command stored in the ROM 132, and boots up a system by executing the O/S. In response to completion of the booting operation, the main CPU 133 copies various application programs stored in the storage 140 to the RAM 131, and executes the application programs copied to the RAM 131 to perform various operations.

The graphic processor 134 constructs various screens according to the control of the main CPU 133. The graphic processor 134 may display various screens as illustrated in FIGS. 13 to 26. The graphic processor 134 calculates a display status value with respect to a screen. The display status value may be a coordinate value of a location where an object is displayed in the screen or a property value representing a shape, a size, or a color of the object. The graphic processor 134 performs a rendering operation based on the display status value and generates a screen.

The structure of a flexible display device illustrated in FIG. 27 is merely an example. Thus, one or more components of FIG. 27 may be omitted or modified, or other components may be added.

As described above, the controller 130 may perform various operations by executing the programs stored in the storage 140.

Figure 28:
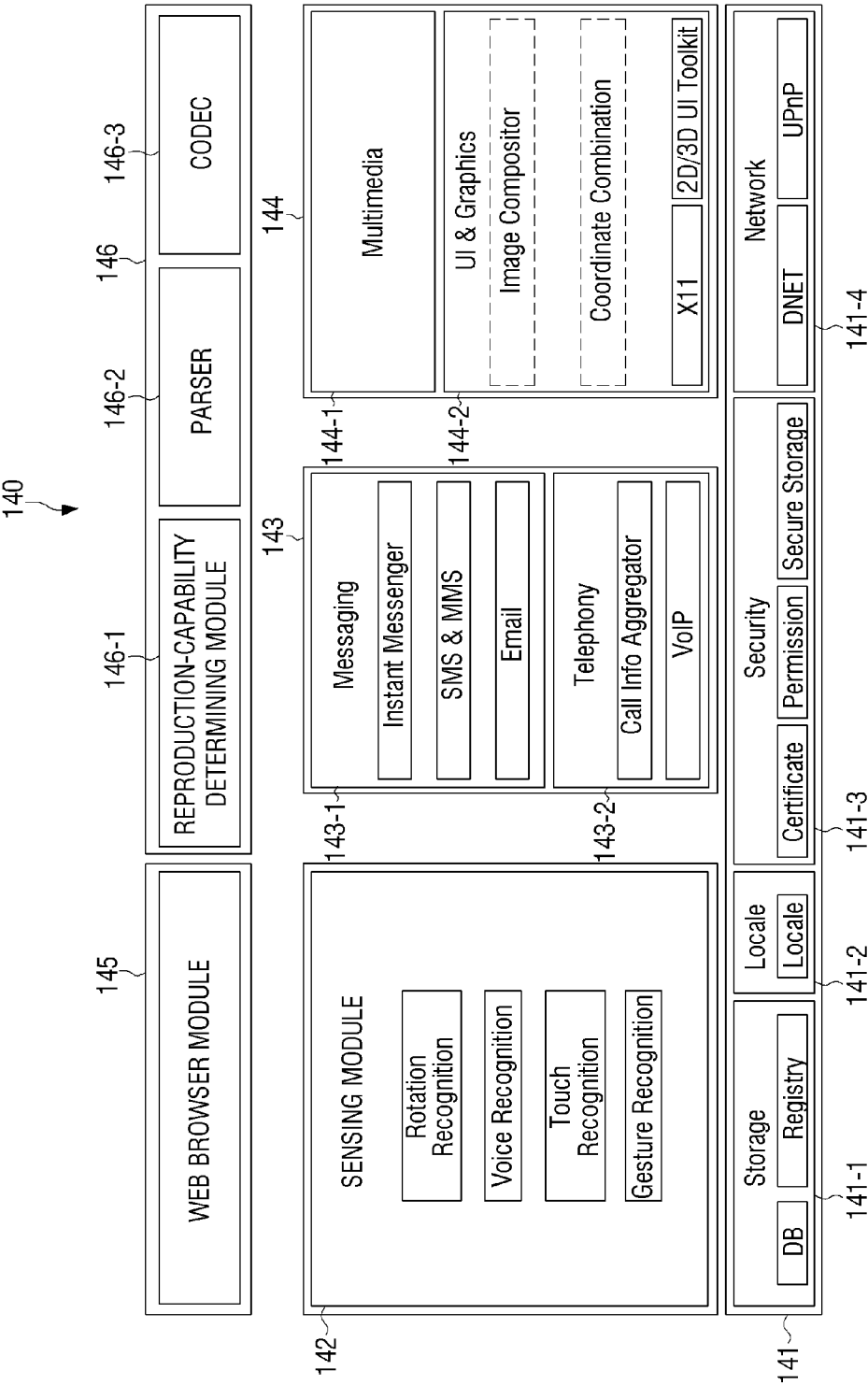
FIG. 28 is a view illustrating a hierarchy of software stored in a storage according to an exemplary embodiment.

FIG. 28 is a view illustrating a hierarchy of software stored in a storage according to an exemplary embodiment. According to FIG. 28, the storage 140 includes a base module 141, a sensing module 142, a communication module 143, a presentation module 144, a web browser module 145, and a content processing module 146.

The base module 141 refers to a basic module which processes signals transmitted from hardware in the flexible display device 100 and transmits the processed signals to an upper layer module.

The base module 141 includes a storage module 141-1, a location-based module 142-2 (locale), a security module 141-3, and a network module 141-4.

The storage module 141-1 refers to a program module which manages a database (DB) or registry. The main CPU 133 may access a database in the storage 140 using the storage module 141-1 to read various data. The location-based module 142-2 refers to a program module which operates with various hardware, such as a GPS chip, to support a location-based service. The security module 141-3 refers to a program module which supports hardware certification, request permission, secure storage, etc. The network module 141-1 refers to a module for supporting network connection and includes a DNET module, a UPnP module, and the like.

The sensing module 142 is a module for managing and using inputs. The sensing module 142 includes a rotation recognition module, a voice recognition module, a touch recognition module, and a gesture recognition module. The rotation recognition module refers to a program which calculates a rotation angle and a rotation direction using a value sensed by a sensor such as the geomagnetic sensor 121 or the gyro sensor 122. The voice recognition module is a program which analyzes a voice signal collected through the microphone 194 to extract a user voice. The touch recognition module is a program which detects a touch coordinate using a value sensed by the touch sensor 124. The gesture recognition module is a program which analyzes an image photographed by the camera 194 to recognize a user gesture.

The communication module 143 is a module for communicating with an external device. The communication module 143 may include a messaging module 143-1 including a messenger program, a Short Message Service (SMS) & Multimedia Message Service (MMS) program, and an e-mail program, and a telephone module 143-2 including a Call Information Aggregator program module and a VoIP module.

The presentation module 144 is a module for constructing a display screen. The presentation module 144 includes a multimedia module 144-1 for reproducing and outputting contents and a UI & Graphics module 144-2 for performing a UI and graphic processing operation. The multimedia module 144-1 may include a player module, a camcorder module, a sound processing module, etc. Accordingly, the multimedia module 144-1 performs operations for reproducing various content to generate and reproduce a screen and sound. The UI & Graphics module 144-2 may include an Image Compositor module which combines images, a coordinate compositor module which combines and generates a coordinate on a screen where an image is displayed, an X11 module which receives various events from various hardware, and a 2D/3D UI toolkit which provides a tool for configuring a 2D or 3D UI.

The web browser module 145 refers to a module which perform a web browsing operation to access a web server. The web browser module 145 may include various modules such as a web view module which configures a web page, a download agent module which performs a download operation, a bookmark module, a Webkit module, etc.

A content processing module 146 refers to software for processing the contents stored the storage 140. A reproduction-capability determining module 146-1 refers to a program which operates based on an algorithm of comparing reproduction capability information and content properties. A parser 146-2 and a Codec 146-3 are software which are provided to the video processor 175 for a content processing operation. The parser 146-2 is usually realized as software only, and the Codec 146-3 may be realized as either software or hardware.

In addition, various application modules, such as a navigation service module and a game module, may be further included.

The program modules of FIG. 28 may be partially omitted, modified, or added according to a type of and the characteristics of the flexible display device 100. For example, in case of the flexible display device 100 being realized as a smart phone, the flexible display device 100 may further include an e-book application, a game application, and other utility programs. In addition, a part of the program modules of FIG. 28 may be omitted.

Figure 29:
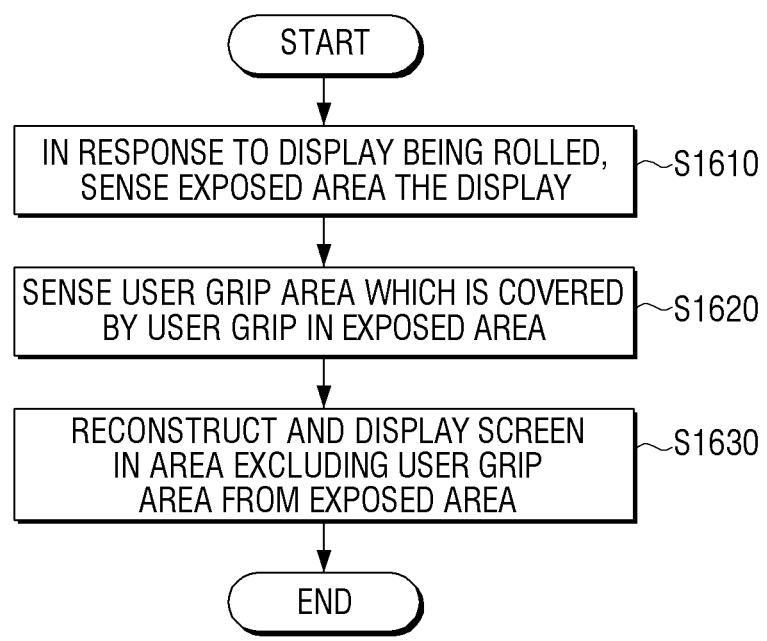
FIG. 29 is a flowchart describing a method of controlling a flexible display device according to an exemplary embodiment.

FIG. 29 is a flowchart describing a method of controlling a flexible display device according to an exemplary embodiment. The flexible display device according to the exemplary embodiment may include a display of which shape may be transformed according to external pressure.

First, in response to the display being rolled, an exposed area which in the rolled state is sensed (S1610). For example, in response to the display being rolled, a size and a location of the exposed area may be determined, a cross section radius in the rolled state may be calculated, and the exposed area may be determined based on the calculated cross section radius.

Subsequently, a user grip area which is covered by a user grip manipulation is sensed (S1620). For example, in response to a touch area which is larger than a predetermined size being sensed in the rolled state for a predetermined time by using a touch sensor which senses a touch area with respect to the display, the touch area may be determined as the user grip area. In addition, in response to pressure which is greater than a predetermined level being sensed in the rolled state for a predetermined time by using a pressure sensor which senses pressure applied to the display, the area from which the pressure was sensed may be determined as the user grip area.

Meanwhile, in response to the exposed area and the user grip area being sensed, a screen is reconstructed and displayed on an area excluding the user grip area on the exposed area (S1630). The screen may be modified in such a way that an object displayed in the user grip area of the screen is moved to another area. In this case, an animation effect that the object is pushed by a user grip manipulation and gradually moved to other area may be expressed.

When the rolled state of the display is released, a screen displayed on the released part of the exposed area may be displayed on an area which is newly exposed according to the release. That is, the screen may be enlarged and displayed in the area which is newly exposed according to the release.

In case of the display being realized as a double-sided display having a first display surface and a second display surface which are on opposite sides of the display 100, when the display is rolled in such a way that the first display surface forms an exposed area and then the rolled state is released, a screen displayed on the exposed area may be displayed on an area which is newly exposed on the second display surface according to the release. That is, a screen displayed on the first display surface which is exposed in the rolled state may be displayed on the second display surface which is newly exposed according to the released state.

Further, when the flexible display device is rolled, an object may be displayed across a boundary portion between an edge area of the display and an exposed area which is engaged with the edge area. That is, a seamless screen may be displayed across the boundary portion between the edge area of the display and the exposed area.

When the display is partially rolled in the direction of the inner surface, a screen may be constructed and displayed so as to correspond to a size and a shape of the remaining area excluding an area which is bent according to the rolling. Alternatively, when the display is partially rolled in the direction of the outer surface, a screen may be constructed and displayed so as to correspond to a size and a shape of the remaining area excluding an area which is in contact between the outer surface and the inner surface of the display. That is, when a display surface of the display partially is rolled in a concave form or rolled in a convex form, a screen may be modified and displayed to correspond to a display surface which is exposed according to the partial rolling.

One or more exemplary embodiments were described above, and thus, the overlapped description will be omitted.

A non-transitory computer readable medium including a program for sequentially performing the controlling methods may be provided.

The non-transitory computer readable medium refers to a medium which may store data permanently or semi-permanently rather than storing data for a short time such as a register, a cache, and a memory and may be readable by an apparatus. As an example, the above-described various applications and programs may be stored in the non-transitory computer readable medium such as a compact disc (CD), a digital versatile disk (DVD), a hard disk, a Blu-ray disk, a universal serial bus (USB), a memory card, a read-only memory (ROM), and the like, and provided therein.

In addition, communication between respective components of the display device may be performed through a bus of the display device. In addition, the display device may further include a processor, such as a CPU, a microprocessor, etc., for performing the above various operations. Furthermore, it is understood that one or more components or elements of the above-described apparatuses and methods may include software and/or hardware, and may be implemented, for example, as at least one processor, a memory, circuitry, etc.

The foregoing exemplary embodiments and advantages are merely exemplary and are not to be construed as limiting the present inventive concept. The present teaching can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A flexible display device comprising:
   a flexible display;
   a first sensor configured to sense an exposed area of the display which is exposed in a rolled state of the display;
   a second sensor configured to sense a user grip area within the exposed area, the user grip area corresponding to a user grip; and
   a controller configured to, in response to the exposed area and the user grip area being sensed, control the display to display a screen on the exposed area excluding the user grip area,
   wherein the display comprises a double-sided display comprising a first display surface and a second display surface facing opposite sides, and
   wherein the controller is further configured to, in response to the display being rolled so that the first display surface comprises the exposed area and then the rolled state being released, control the display to display the screen displayed on the exposed area on a newly exposed area of the second display surface exposed by the release.

2. The flexible display device as claimed in claim 1, wherein the controller is further configured to change a screen displayed on the exposed area so that an object displayed on the user grip area is moved to an area of the exposed area other than the user grip area.

3. The flexible display device as claimed in claim 2, wherein the controller is further configured to control the display to display an animation effect of moving the object from the user grip area to the other area of the exposed area.

4. The flexible display device as claimed in claim 1, wherein the controller is further configured to, in response to the rolled state of the display being released, control the display to display the screen displayed on the exposed area on a newly exposed area of the display exposed by the release.

5. The flexible display device as claimed in claim 1, wherein the controller is further configured to, in response to the display being partially rolled in a direction of an inner surface of the display, control the display to display the screen corresponding to a size and a shape of a remaining area of the display excluding an area which is bent by the partial rolling.

6. The flexible display device as claimed in claim 1, wherein the controller is further configured to, in response to the display being partially rolled in a direction of an outer surface, control the display to display the screen corresponding to a size and a shape of a remaining area of the display excluding an area of a screen of the display which is in contact with an inner surface of the display.

7. The flexible display device as claimed in claim 1, wherein the controller is further configured to, when the display is in the rolled state, determine a size and a location of the exposed area based on a sensing result of the first sensor.

8. The flexible display device as claimed in claim 1, wherein the controller is further configured to, when the display is in the rolled state, calculate a cross section radius of the display based on the sensing result of the first sensor, and determine the exposed area based on the calculated cross section radius.

9. The flexible display device as claimed in claim 1, wherein the second sensor comprises a pressure sensor configured to sense pressure applied to the display, and
   the controller is further configured to, in response to the pressure being greater than a predetermined level and being sensed for a predetermined time while the flexible display device is in the rolled state, determine that an area where the pressure was sensed is the user grip area.

10. The flexible display device as claimed in claim 1, further comprising a transceiver configured to receive a text message,
    wherein the controller is further configured to control the display to display the received text message overlapping the displayed screen.

11. The flexible display device as claimed in claim 1, further comprising a camera configured to capture an image of a user,
    wherein the controller is further configured to determine a portion of the exposed area viewed by the user based on the captured image, and to control the display to display the screen on the viewed portion of the exposed area.

12. The flexible display device as claimed in claim 1, wherein the controller is further configured to, in response to a starting point and a destination being entered while the display is in a flat state and the display being rolled into the rolled state, control the display to display route information on the exposed area.

13. The flexible display device as claimed in claim 1, wherein the controller is further configured to, in response to a starting point and a destination being entered while the display is in a flat state and the display being rolled into the rolled state, control the display to display a plurality of recommended routes on the exposed area.

14. The flexible display device as claimed in claim 1, wherein the controller is further configured to, in response to the flexible display device being pointed towards one or more points of interest while the display is in the rolled state, control the display to display list of the plurality of points of interest on the exposed area.

15. The flexible display device as claimed in claim 1, wherein the second sensor comprises a touch sensor configured to sense a touched area on the display, and
    wherein the controller is further configured to, in response to the touched area being larger than a predetermined size and being sensed for a predetermined time while the flexible display device is in the rolled state, determine that the touched area is the user grip area.

16. The flexible display device as claimed in claim 1, wherein the controller is further configured to, when the flexible display device is in the rolled state, control the display to display an object across a boundary portion between an edge area of the display and an area of the exposed area which coincides with the edge area.

17. A method of controlling a flexible display device with a display, the method comprising:
    a first sensing which comprises sensing an exposed area of the display that is exposed while the display is in a rolled state;

a second sensing which comprises sensing a user grip area within the exposed area, the user grip area corresponding to a user grip; and reconstructing and displaying, in response to the exposed area and the user grip area being sensed, a screen on the exposed area excluding the user grip area, wherein the display comprises a double-sided display comprising a first display surface and a second display surface facing opposite sides, and wherein the method further comprises displaying the screen displayed on the exposed area on a newly exposed area of the second display surface exposed by the release, in response to the display being rolled so that the first display surface comprises the exposed area and then the rolled state being released.

18. The method as claimed in claim 17, wherein the displaying comprises changing a screen displayed on the exposed area so that an object displayed on the user grip area is moved to an area of the exposed area other than the user grip area.

19. The method as claimed in claim 18, wherein the displaying comprises displaying an animation effect of the object moving from the user grip area to the area of the exposed area excluding the user grip area.

* * * * *